(12) United States Patent
Shukla

(10) Patent No.: US 11,134,510 B1
(45) Date of Patent: Sep. 28, 2021

(54) TRANSMIT SCHEDULING IN MULTI-RADIO DEVICES

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 16/382,053

(22) Filed: Apr. 11, 2019

(51) Int. Cl.
*H04W 72/12* (2009.01)
*H04W 84/12* (2009.01)
*H04W 52/04* (2009.01)

(52) U.S. Cl.
CPC ....... *H04W 72/1278* (2013.01); *H04W 52/04* (2013.01); *H04W 84/12* (2013.01)

(58) Field of Classification Search
CPC .. H04W 72/1278; H04W 52/04; H04W 84/12
See application file for complete search history.

(56) References Cited

U.S. PATENT DOCUMENTS

| | | | | |
|---|---|---|---|---|
| 2016/0128130 A1* | 5/2016 | Sadek | ................... | H04W 76/28 370/328 |
| 2016/0242031 A1* | 8/2016 | Ojanen | ................. | H04W 28/16 |
| 2020/0288523 A1* | 9/2020 | Patil | ...................... | H04L 1/1621 |

OTHER PUBLICATIONS

Chen-Mou Cheng et al., "WSN07-1: Adjacent Channel Interference in Dual-radio 802.11a Nodes and Its Impact on Multi-hop Networking" Date of Conference: Nov. 27-Dec. 1, 2006, Published in: IEEE Globecom 2006.
The Effects of Adjacent Channel Rejection and Adjacent Channel Interference on 802.11 WLAN Performance, SPLY005, Nov. 2003, White Paper.

* cited by examiner

*Primary Examiner* — Brian P Cox
(74) *Attorney, Agent, or Firm* — Lowenstein Sandler LLP

(57) ABSTRACT

Technologies transmit scheduling in multi-radio devices are described. One multi-radio device includes first and second radios and a scheduler circuit. The scheduler circuit outputs a first signal to the radios in a first mode in which the first radio is transmitting first data and the second WLAN radio is transmitting second data concurrently. The first signal increases a first clear channel assessment energy detect (CCA-ED) threshold to a second CCA-ED threshold. The scheduler circuit outputs a second signal to the second WLAN radio in a second mode. The second signal causes transmission of fourth data to be delayed until after the first radio completes reception of third data. In a third mode, the scheduler circuit outputs a third signal to the first WLAN radio. The third signal causes transmission of fifth data to be delayed until after the second radio completes reception of sixth data.

20 Claims, 10 Drawing Sheets

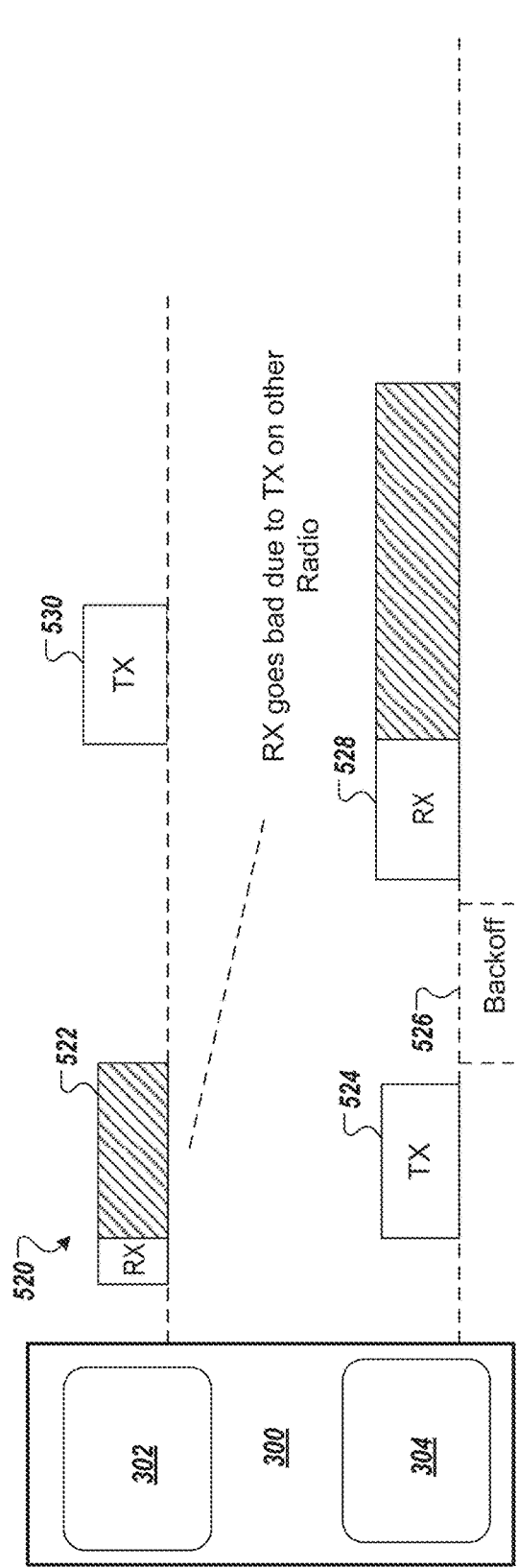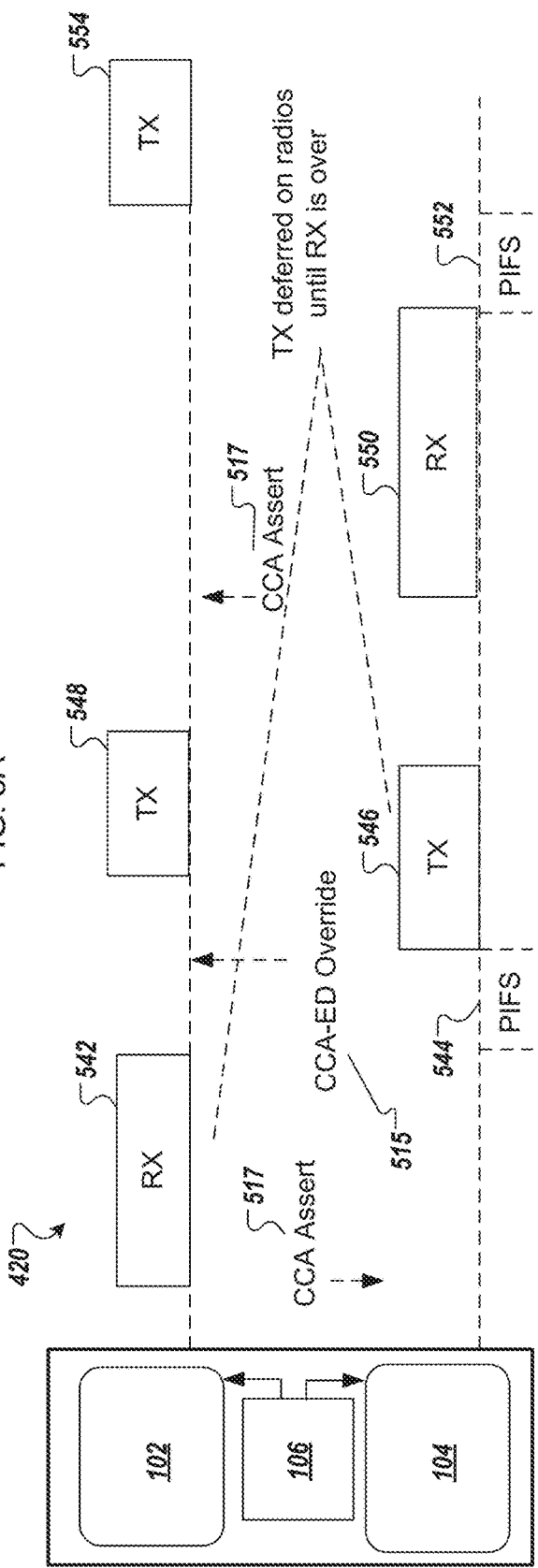

US 11,134,510 B1

TRANSMIT SCHEDULING IN MULTI-RADIO DEVICES

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 5A is a timing diagram illustrating bad reception of data on a first radio caused by transmission of data by a second radio in a RX-TX mode of a conventional multi-radio device according to one implementation.

FIG. 5B is a timing diagram illustrating reception of data on a first radio and deferred transmission of data by a second radio of the multi-radio device with the multi-radio transmit scheduler circuit in a RX-TX mode according to one embodiment.

DETAILED DESCRIPTION

Figure 1:
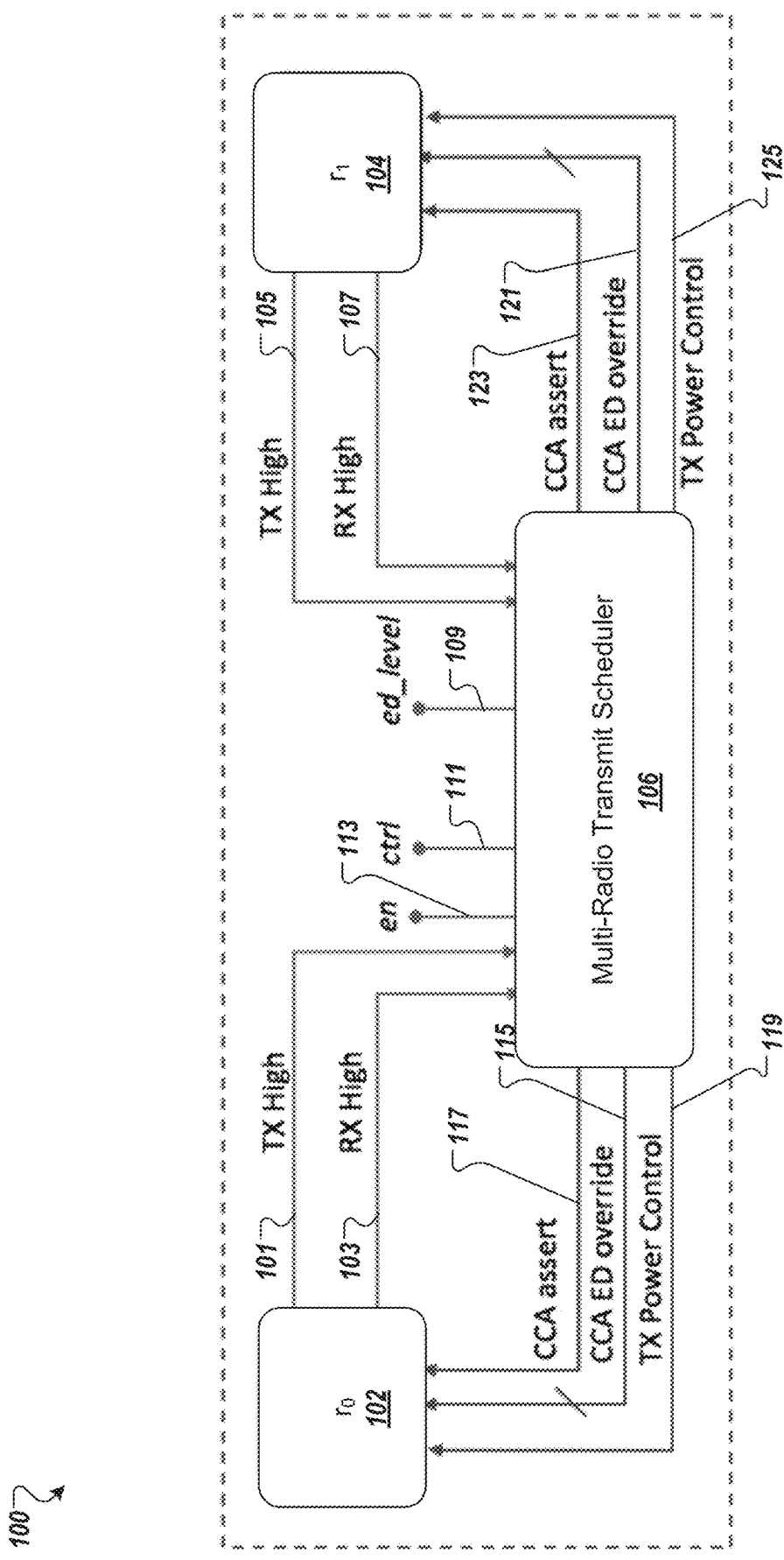
FIG. 1 is a block diagram of a multi-radio device having two radios and a multi-radio transmit scheduler circuit according to one embodiment.

Technologies transmit scheduling in multi-radio devices are described. A multi-radio device contains multiple radios in the same physical assembly. The size of consumer device causes these radios to be considered "collocated radios." In various devices, these radios operate pretty much independently, subject to the IEEE 802.11 carrier sense multiple access (CSMA) and collision avoidance (CA) rules. The CSMA/CA protocol is used to ensure that any radio does not transmit while another is already transmitting on the same channel. Standards define a physical carrier sense mechanism to determine if the radio frequency (RF) medium is busy. The physical carrier sense mechanism can determine whether a frame transmission is inbound for a station to receive and whether the medium is busy before transmitting. Clear channel assessment (CCA) thresholds can be used to appraise the RF medium and involves listening for RF transmissions at the physical layer. There are two common CCA thresholds that are used when listening to the RF medium: 1) a signal detect (SD) threshold (also referred to as preamble detect threshold or preamble carrier sense threshold) that identifies preambles of frame transmissions from another radio; and 2) an energy detect (ED) threshold that identify any type of RF transmissions during CCA. Collocated radios in a multi-radio device, even when operated on different channels, suffer from throughput capacity degradation, given their antenna's physical separation and their ability to avoid conflicts where one radio transmission affect performance of other radio's transmission or reception. In particular, the radios suffer from adjacent channel interference (ACI), where transmission on the adjacent channel by one radio reduces Signal to Noise Interference ratio (SINR) of the other radios due to spectral leakage. For example, a radio operating on the 5 GHz channel 36 at 40 MHz bandwidth leaks energy into channels 48, 52, and 60 depending on the distance between antennas of the collocated radios. This spectral leakage is referred to as ACI.

Aspects of the present disclosure address the above and other deficiencies by a multi-radio transmit scheduler. The aspects of the present disclosure take into account the radios' transmit frame durations, receive frame durations, and a dynamic CCA threshold to control transmissions of the multiple radios in the multi-radio device. The aspects of the present disclosure attempts to increase the available wireless capacity by coordinating radios transmissions to behave in a certain way that minimizes mutual interferences between radios. The aspects of the present disclosure can be implemented in a multi-radio transmit scheduler circuit, such a hardware state machine.

The multi-radio transmit scheduler circuit can including various scheduling features based on different modes of the multi-radio device, including the capability to override a CCA threshold on a particular radio, such as the CCA energy detect (CCA-ED) threshold, to allow transmissions when the current CCA values may be seen as higher due to the ACI impact from the other radio. The CCA-ED threshold is used for spectral sharing. A receive of a radio issues a channel busy signal to indicate a channel busy condition for the RF medium when any signal having a received signal strength that exceeds the CCA-ED threshold. In a conventional TX-TX mode, radios on the adjacent channel may defer transmission due to false CCA energy detect coming from other radio's transmission. By overriding the CCA-ED threshold, multiple radios can transmit data concurrently in a TX-TX mode or TX-TX-TX mode. This mode is used when multiple radios are attempting to transmit at almost the same time (frame duration overlaps with transmission attempt by other radio).

The multi-radio transmit scheduler circuit can include the capability to avoid transmission by a radio (TX) radio) when a receiving (RX) radio's reception may get impaired by sending a CCA signal (e.g., assert CCA signal high) to the TX radio. In a transmit-receive (TX-RX) mode or a receive-transmit (RX-TX) mode, one radio is about to transmit while other radio is receiving a frame. When RX radio has low SINR, a transmission from other radio can further lower the SINR causing RX packets to become corrupted (referred to as bad reception). To mitigate this, upon detecting receive signal high from the RX radio, the multi-radio transmit scheduler asserts CCA signal high on the other radio(s), preventing the other radio(s) from initiating a transmission during the receive frame duration of the RX radio. In one implementation, a radio is only allowed to transmit if the CCA signal detected is below the Energy and Preamble detect thresholds of the standard 802.11 listen before talk procedures. By asserting the CCA signal high, the multi-radio transmit scheduler prevents other radios from initiating any transmission in the middle of the on-going receive operation. Once the current receive frame duration is over the multi-radio transmit schedule circuit is reset and the transmission for the other radio can resume if requested. As such, the Therefore, multi-radio transmit schedule can operate on a frame exchange basis (e.g. PLCP Protocol Data Unit (PPDU) basis).

The multi-radio transmit scheduler circuit can include the capability to lower transmission power on a TX radio when a RX radio's reception may get impaired by sending a transmit power control signal to the TX radio. This can be done in the RX-TX and TX-RX modes, but when certain conditions apply. For example, the transmission power can be reduced when a link budget allows successful transmission. The link budget may depend on the distance between the transmitter and receiver. Once the current receive frame duration is over the multi-radio transmit schedule circuit is reset and the transmission for the other radio can resume if requested. Therefore, multi-radio transmit schedule can operate on a frame exchange basis (e.g. PPDU basis).

FIG. 1 is a block diagram of a multi-radio device 100 having two radios and a multi-radio transmit scheduler circuit according to one embodiment. The multi-radio device 100 includes a first wireless local area network (WLAN) radio 102, a second WLAN radio 104, and a multi-radio transmit scheduler circuit 106 coupled to the first WLAN radio 102 and the second WLAN radio 104. The multi-radio device 100 can include two or more radios that are controlled by the multi-radio transmit scheduler circuit 106. The multi-radio transmit scheduler circuit 106 can be a hardware block coupled to a hardware bus, e.g., high-speed general purpose input-output (GPIO) pins. Alternatively, other interfaces are possible to communicate signals between components. The multi-radio transmit scheduler circuit 106 can receive signals from the multiple radios, as well as from a host processor (not illustrated in FIG. 1). These input signals can be used to transition between states or modes of the multi-radio transmit scheduler circuit 106.

As illustrated in FIG. 1, the multi-radio transmit scheduler circuit 106 can receive a first TX state signal 101 and a first RX state signal 103 from the first WLAN radio 102. The first TX state signal 101 indicates that the first WLAN radio 102 is transmitting data. The first RX state signal 103 indicates that the first WLAN radio 102 is receiving data. Similarly, the multi-radio transmit scheduler circuit 106 can receive a second TX state signal 105 and a second RX state signal 107 from the second WLAN radio 104. The second TX state signal 105 indicates that the second WLAN radio 104 is transmitting data. The second RX state signal 107 indicates that the second WLAN radio 104 is receiving data. The state signal is also referred to as a mode signal or just a signal. The mode signal can indicate whether the radio is operating in a specific mode and transmitting data or receiving data. The mode signals can be used by the multi-radio transmit scheduler circuit to determine the mode or state of the multi-radio transmit scheduler for controlling the radios. The multi-radio transmit scheduler circuit 106 can also receive an energy detect level (ed_level) signal 109, a control signal 111, and an enable signal 113. These signals can be received from a host processor or from other components in the multi-radio device 100. Based on the inputs 101-113, the multi-radio transmit scheduler circuit 106 transitions between multiple modes (e.g., between states of a state machine). In each mode, based on the inputs, the multi-radio transmit scheduler circuit 106 outputs various control signals to the first WLAN radio 102 and the second WLAN radio 104 to coordinate transmissions of the collocated radios on a frame exchange basis.

As illustrated in FIG. 1, the multi-radio transmit scheduler circuit 106 can output control signals to the multiple radios to control transmissions by the multiple radios based on the states or modes, including a first CCA-ED override signal 115, a first CCA assert signal 117, and a first TX power control signal 119 to control the first WLAN radio 102 and a second CCA-ED override signal 121, a second CCA assert signal 123, and a second TX power control signal 125 to control the second WLAN radio 104.

The first CCA-ED override signal 115 causes the first WLAN radio 102 to adjust a first CCA-ED threshold to a third CCA-ED threshold that is higher than the first CCA-ED threshold. The second CCA-ED override signal 121 causes the second WLAN radio 104 to adjust a second CCA-ED threshold to a fourth CCA-ED threshold that is higher than the second CCA-ED threshold. The third CCA-ED threshold and the fourth CCA-ED threshold allow the first WLAN radio 102 and the second WLAN radio 104 concurrent transmissions by preventing a CCA-ED value from exceeding the respective CCA-ED threshold.

The first CCA assert signal 117 prevents the first WLAN radio 102 from transmitting data, such as during a receive frame duration of the second WLAN radio 104. The first CCA assert signal 117 prevents ACI energy leakage at the second WLAN radio 104 by the first WLAN radio 102 during a receive frame duration. The second CCA assert signal 123 prevents the second WLAN radio 104 from transmitting data, such as during a receive frame duration of the first WLAN radio 102. The second CCA assert signal 123 prevents ACI energy leakage at the first WLAN radio 102 by the second WLAN radio 104 during a receive frame duration.

The first transmit power control signal 119 causes the first WLAN radio 102 to transmit data at a reduced transmit power during a receive frame duration of the second WLAN radio 104. The reduced transmit power can be a minimum power level at which the frame can be successfully communicated. The first transmit power control signal 119 reduces ACI energy leakage caused by the first WLAN radio 102 during a receive frame duration of the second WLAN radio 104. The second transmit power control signal 125 causes the second WLAN radio 104 to transmit data at a reduced transmit power during a receive frame duration of the first WLAN radio 102. The reduced transmit power can be a minimum power level at which the frame can be successfully communicated. The second transmit power control signal 125 reduces ACI energy leakage caused by the second WLAN radio 104 during a receive frame duration of the first WLAN radio 102.

In one embodiment, when a radio starts transmission, the radio asserts the "TX High" signal high for a current PPDU burst duration. When a radio starts reception of data, the radio asserts the "RX High" signal high for the current PPDU receive duration. The PPDU receive duration may be slightly less than the actual over the air PPDU duration due to preamble decode overhead. In such cases, received PPDU duration compensates for the preamble duration. As described above, when CCA values measured on the RF medium exceed a CCA threshold, the radio can detect CCA busy radio (i.e., channel is busy, which prevents the radio from transmitting. Using the CCA assert signal (117, 123), the multi-radio transmit scheduler circuit 106 can prevent the radio from transmitting as if it were busy. For example, the radio can include a CCA assert pin that receives the CCA assert signal. When the CCA assert signal is high, the radio can treat the channel as busy on the radio, preventing the radio from transmitting data. However, unlike conventional multi-radio devices, the radio does not treat the RF medium as "busy" with a full backoff duration required after the transmit frame duration is completed, rather the radio can resume transmission after a PCF Interframe Space (PIFS) duration when the CCA assert pin goes low. The full backoff duration, also referred to as backoff Arbitrary Interframe Space (AIFS), can be much larger in duration than PIFS duration. Waiting for full backoff may also result in the radio losing the ability to transmit if some other device starts transmission during this time.

In one embodiment, the radios can maintain different levels of CCA thresholds into programmable registers. For example, two CCA-ED thresholds are stored in the programmable registers: a default CCA-ED threshold, which is per the default operation of the radio; and a second CCA-ED threshold that is being used as per the CCA-ED override signal. When there are more than two CCA-ED thresholds available, the energy detect level signal (ed_level) received at a pin on the multi-radio transmit scheduler circuit 106 selects whether to use the second CCA-ED threshold or a third CCA-ED threshold. For example, the multi-radio transmit scheduler 106 can use three CCA-ED thresholds (e.g., default, mid, and high thresholds). The CCA-ED override signal can be multiple bits to control between three or more CCA-ED thresholds at the respective radios. For example, when energy detect level signal 109 is held high, the multi-radio transmit scheduler 106 selects the third CCA-ED threshold when the CCA-ED override signal is asserted; otherwise, the second CCA-ED threshold is selected when the CCA-ED overrise signal. When the CCA-ED override signal is not asserted, the radio uses the default CCA-ED threshold. Alternatively, the multi-radio transmit scheduler 106 can select between two or more CCA-ED thresholds at the radio using other techniques. In general, the CCA-ED override signal controls the respective radio to increase its current CCA-ED threshold in cases when the SINR is reduced upon adjacent radio's transmission on the adjacent channel due to ACI. The adjusted CCA-ED threshold is used by the radio until the PPDU duration. Upon expiration of the PPDU duration, the multi-radio transmit scheduler 106 resets (e.g., the state machine resets). The multi-radio transmit scheduler 106 can operate on a per PPDU basis (frame exchange basis).

In other embodiments, the multi-radio transmit scheduler 106 can use the TX power control signal to control the radio to use a lowest transmit power that can successfully deliver frame to the receiver. For example, when the TX power control is held high, the radio reduces the transmit power to a minimum level just enough to deliver the frame successfully. The ability to switch between TX power control and or CCA assert is determined by the available link budget between the transmitter and the receiver. The ctrl pin of the multi-radio transmit scheduler circuit 106, when held high, selects the TX power control mode for all operations. When ctrl pin is held low, the CCA assert mode is selected, which is also the default mode when ctrl signal is not present or held low. Typically, based on the deployment, a high-level application can determine the link budget and can choose to select CCA assert mode or TX power control mode using a control signal at the ctrl pin, for example, when the devices are pretty close to each other in a point-to-point topology.

In one embodiment, there are four modes possible for the multi-radio device 100 that has two radios. The four modes depend on the radios' transmission or reception states as summarized in Table 1 below. In another embodiment, there are more than four modes possible for a multi-radio device with three radios as summarized in Table 2 below. The Radios TX, RX operations do not have to be exactly at the same time, but very close such that the operation TX, RX on one radio overlaps with attempt to perform operation TX, RX on another radio.

TABLE 1

Radios TX/RX modes and capacity impact for two-radio device

| Radio 0 $r_0$ | Radio 1 $r_1$ | Default behavior | With Multi-radio Transmit Scheduler |
|---|---|---|---|
| TX | TX | Because of the ACI these radios may not be able to transmit concurrently | radios adjust their CCA threshold in this case, to overcome ACI energy leakage causing CCA go high, and perform concurrent transmissions. |
| TX | RX | $r_1$ may not be able to receive; degraded SINR due to radio $r_0$ transmission. | radio $r_0$ CCA is held high for the receive PPDU duration, to overcome ACI energy leakage causing RX go bad on $r_1$. OR (subject to link budget) radio $r_0$ Tx Power Control is held high for the minimum of the receive and transmit PPDU duration, to reduce the Tx Power on radio $r_0$ reducing energy leakage causing RX go bad on $r_1$. |

TABLE 1-continued

Radios TX/RX modes and capacity impact for two-radio device

| Radio 0 $r_0$ | Radio 1 $r_1$ | Default behavior | With Multi-radio Transmit Scheduler |
|---|---|---|---|
| RX | TX | $r_0$ may not be able to receive; degraded SINR due to radio $r_1$ transmission. | radio $r_1$ CCA is held high for receive duration, to overcome ACI energy leakage causing RX go bad on r0. OR (subject to link budget) radio $r_1$ Tx Power Control is held high for the minimum of the receive and transmit PPDU duration, to reduce the Tx Power on radio r1 reducing energy leakage causing RX go bad on $r_0$. |
| RX | RX | Directional radios may work fine. Omni radios may suffer collisions. | No change |

TABLE 2

Radios TX/RX modes and capacity impact for three-radio device
Table 2: Multiple Radios TX/RX modes and capacity impact

| | Radios | | | | With Multi-radio |
|---|---|---|---|---|---|
| | 0 | 1 | 2 | Default behavior | Transmit Scheduler |
| 0 | TX | TX | TX | Because of the ACI these radios may not be able to transmit concurrently | radios adjust their CCA threshold in this case, to overcome ACI energy leakage causing CCA go high, and perform concurrent transmissions. A transmission on any of the radios adjust CCA-ED on all other radios for the duration of frame exchange. |
| 1 | TX | TX | RX | $r_2$ may not be able to receive; degraded SINR due to other radios transmissions. | Except $r_2$, all radios CCA is held high for the receive PPDU duration, to overcome ACI energy leakage causing RX go bad on $r_0$. OR (subject to link budget) radio Tx Power Control is held high for the minimum of the receive and transmit PPDU duration, to reduce the Tx Power on radio reducing energy leakage causing RX go bad on $r_0$. |
| 2 | TX | RX | TX | $r_0$ may not be able to receive; degraded SINR due to radio $r_1$ transmission. | radio $r_1$ CCA is held high for receive duration, to overcome ACI energy leakage causing RX go bad on r0. OR (subject to link budget) radio $r_1$ Tx Power Control is held high for the minimum of the receive and transmit PPDU duration, to reduce the Tx Power on radio r1 reducing energy leakage causing RX go bad on $r_0$. |
| 3 | TX | RX | RX | Similar to Case 1 & 2 above | |
| 4 | RX | TX | TX | Similar to Case 1 above | |
| 5 | RX | TX | RX | Similar to Case 1 & 2 above | |
| 6 | RX | RX | TX | Similar to Case 1 & 2 above | |
| 7 | RX | RX | RX | Directional radios may work fine. Omni radios may suffer collisions. | No change |

In some embodiments, the first WLAN radio 102 and the second WLAN radio 104 communicate data with other radios via WLAN channels at 2.4 GHz (e.g., 2.4 GHz band of the Wi-Fi® network technologies), 5 GHz (e.g., 5 GHz band of the Wi-Fi® network technologies), or both. The multi-radio device 100 can be any electronic device that uses two WLAN radios, including but not limited to routers, switches, network devices, access points, client devices, TVs, mobile phones, streaming media players, tablets, game consoles, PCs, servers, voice-controlled devices, or the like. For example, the multi-radio device 100 can be a multi-radio multi-channel (MRMC) mesh network device. In one embodiment, the multi-radio device 100 can be compliant with IEEE 802.11 protocols, including IEEE 802.11s mesh protocols as a mesh point station (MP STA), mesh access point (MAP), mesh port (MPP). A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

In another embodiment, a multi-radio device includes a first WLAN radio that operates with a first CCA-ED threshold that prevents the first WLAN radio from transmitting data when the first WLAN radio detects a first CCA-ED value that exceeds the first CCA-ED threshold. The first CCA-ED value representing an adjacent channel interference (ACI) energy leakage. The multi-radio device also includes a second WLAN radio that operates with a second CCA-ED threshold that prevents the second WLAN radio from transmitting data when the second WLAN radio detects a second CCA-ED value that exceeds the second CCA-ED threshold. The multi-radio device also includes a transmit scheduler circuit coupled to the first WLAN radio and the second WLAN radio. The transmit scheduler circuit can include hardware state machine and can be configured to control the first WLAN radio and the second WLAN radio. The transmit scheduler circuit receives a first signal from the first WLAN radio, the first signal indicating that the first WLAN radio is operating in a first mode and transmitting a first frame during a first duration. The transmit scheduler circuit receives a second signal from the second WLAN radio, the second signal indicating that the second WLAN radio is operating in a second mode and transmitting a second frame during a second duration, wherein the first duration and the second duration overlap. The transmit scheduler circuit outputs a first CCA-ED override signal to the first WLAN radio. The first CCA-ED override signal causes the first WLAN radio to change, during the second duration, the first CCA-ED threshold to a third CCA-ED threshold that is higher than the first CCA-ED threshold. The transmit scheduler circuit outputs a second CCA-ED override signal to the second WLAN radio. The second CCA-ED override signal causes the second WLAN radio to change, during the first duration, the second CCA-ED threshold to a fourth CCA-ED threshold that is higher than the second CCA-ED threshold. The first CCA-ED override signal and the second CCA-ED override signal allow the first WLAN radio and the second WLAN radio to concurrently transmit the first frame and the second frame.

In a further embodiment, the transmit scheduler circuit receives a third signal from the first WLAN radio, the third signal indicating that the first WLAN radio is operating in a third mode and receiving a third frame during a third duration. The transmit scheduler circuit outputs, during the third duration, a CCA assert signal to the second WLAN radio, the CCA assert signal preventing the second WLAN radio from transmitting a fourth frame during the third duration. The second WLAN radio, when receiving the CCA assert signal, does not cause ACI energy leakage at the first WLAN radio during the third duration. After expiration of the third duration and a PIFS duration, the transmit scheduler circuit receives a fourth signal from the second WLAN radio, the fourth signal indicating that the second WLAN radio is operating in a fourth mode and transmitting a fifth frame during a fourth duration. The transmit scheduler circuit outputs the first CCA-ED override signal to the first WLAN radio. The first CCA-ED override signal causes the first WLAN radio to change, during the fourth duration, the first CCA-ED threshold to the second CCA-ED threshold.

In another embodiment, the transmit scheduler circuit receives a third signal from the first WLAN radio, the third signal indicating that the first WLAN radio is operating in a third mode and receiving a third frame during a third duration. The transmit scheduler circuit outputs, during the third duration, a transmit power control signal to the second WLAN radio that transmits data at a first transmit power, the transmit power control signal causing the second WLAN radio, during the third duration, to transmit data at a second transmit power that is less than the first transmit power. The second WLAN radio, when receiving the transmit power control signal, reduces ACI energy leakage at the first WLAN radio from a first level to a second level that is less than the first level. The ACI energy leakage at the first WLAN radio is caused by the second WLAN radio transmitting the data at the second transmit power during the third duration. after the third duration and an Arbitrary Interframe Space (AIFS) duration, the transmit scheduler circuit receives at least one of an additional signal from at least one of the first WLAN radio or the second WLAN radio.

In another embodiment, an electronic device includes a first WLAN radio, a second WLAN radio, and a scheduler circuit coupled to the first WLAN radio and the second WLAN radio. The scheduler circuit can control transmissions by the first WLAN radio and the second WLAN radio using control signals as described below. The scheduler circuit outputs a first signal to the first WLAN radio and second WLAN radio in a first mode in which the first WLAN radio is transmitting first data and the second WLAN radio is transmitting second data concurrently, the first signal increasing a first CCA-ED threshold of the first WLAN radio to a second CCA-ED threshold and increasing a third CCA-ED threshold of the second WLAN radio to a fourth CCA-ED threshold. The scheduler circuit outputs a second signal to the second WLAN radio in a second mode in which the first WLAN radio is receiving third data and the second WLAN radio is transmitting fourth data, the second signal causing transmission of the fourth data to be delayed until after the first WLAN radio completes reception of the third data. The scheduler circuit outputs a third signal to the first WLAN radio in a third mode in which the first WLAN radio is transmitting fifth data and the second WLAN radio is receiving sixth data, the third signal causing transmission of the fifth data to be delayed until after the second WLAN radio completes reception of the sixth data.

In a further embodiment, the scheduler circuit outputs output a fourth signal to the second WLAN radio in a fourth mode in which the first WLAN radio is receiving seventh data and the second WLAN radio is transmitting eighth data, the fourth signal causing the second WLAN radio to change a transmit power level from a first level to a second level that is less than the first level. The second WLAN radio transmit the eighth data at the second transmit power while the first WLAN radio receives the seventh data. The scheduler circuit outputs a fifth signal to the second WLAN radio in a fifth mode in which the first WLAN radio is transmitting ninth data and the second WLAN radio is receiving tenth data, the fifth signal causing the first WLAN radio to change a transmit power level from a third level to a fourth level that is less than the third level. The first WLAN radio transmits the ninth data at the second transmit power while the second WLAN radio receives the tenth data.

In a further embodiment, the electronic device includes a third WLAN radio coupled to the scheduler circuit. The scheduler circuit outputs the first signal to the first WLAN radio, the second WLAN radio, and the third WLAN radio in a fourth mode in which the first WLAN radio is transmitting seventh data, the second WLAN radio is transmitting eighth data, and the third WLAN radio is transmitting ninth data concurrently, the first signal increasing the first CCA-ED threshold of the first WLAN radio to the second CCA-ED threshold, increasing the third CCA-ED threshold of the second WLAN radio to the fourth CCA-ED threshold, and increasing a fifth CCA-ED threshold of the third WLAN radio to a sixth CCA-ED threshold. The scheduler circuit outputs the second signal to the first WLAN radio and the second WLAN radio in a fifth mode in which the first WLAN radio is transmitting tenth data and the second WLAN radio is transmitting eleventh data and the third WLAN radio is receiving twelfth data, the second signal causing transmissions of the tenth data and the eleventh data to be delayed until after the third WLAN radio completes reception of the twelfth data. The scheduler circuit outputs the second signal to the first WLAN radio and the third WLAN radio in a sixth mode in which the first WLAN radio is transmitting thirteenth data and the third WLAN radio is transmitting fourteenth data and the second WLAN radio is receiving fifteenth data, the second signal causing transmissions of the thirteenth data and the fourteenth data to be delayed until after the second WLAN radio completes reception of the fifteenth data. The scheduler circuit outputs the second signal to the second WLAN radio and the third WLAN radio in a seventh mode in which the second WLAN radio is transmitting sixteenth data and the third WLAN radio is transmitting seventeenth data and the first WLAN radio is receiving eighteenth data, the second signal causing transmissions of the sixteenth data and the seventeenth data to be delayed until after the first WLAN radio completes reception of the eighteenth data. The scheduler circuit outputs the second signal to the first WLAN radio in an eighth mode in which the first WLAN radio is transmitting nineteenth data and the second WLAN radio is receiving twentieth data and the third WLAN radio is receiving twenty-first data, the second signal causing transmissions of the nineteenth data to be delayed until after the second WLAN radio completes reception of the twentieth data and after the third WLAN radio completes reception of the twenty-first data.

In another embodiment, the scheduler circuit outputs the first signal to the first WLAN radio, the second WLAN radio, and the third WLAN radio in a fourth mode in which the first WLAN radio is transmitting seventh data, the second WLAN radio is transmitting eighth data, and the third WLAN radio is transmitting ninth data concurrently, the first signal increasing the first CCA-ED threshold of the first WLAN radio to the second CCA-ED threshold, increasing the third CCA-ED threshold of the second WLAN radio to the fourth CCA-ED threshold, and increasing a fifth CCA-ED threshold of the third WLAN radio to a sixth CCA-ED threshold;

The scheduler circuit outputs a fourth signal to the first WLAN radio and the second WLAN radio in a fifth mode in which the first WLAN radio is transmitting tenth data and the second WLAN radio is transmitting eleventh data and the third WLAN radio is receiving twelfth data, the fourth signal causing the first WLAN radio and second WLAN radio to change a transmit power level from a first level to a second level that is less than the first level. The first WLAN radio transmits the tenth data at the second transmit power and the second WLAN radio transmits the eleventh data at the second transmit power while the third WLAN radio receives the twelfth data. The scheduler circuit outputs a fifth signal to the first WLAN radio and the third WLAN radio in a sixth mode in which the first WLAN radio is transmitting thirteenth data and the third WLAN radio is transmitting fourteenth data and the second WLAN radio is receiving fifteenth data, the fifth signal causing the first WLAN radio and the third WLAN radio to change the transmit power level to the second level. The first WLAN radio transmit the thirteenth data at the second level and the third WLAN radio transmits the fourteenth data at the second level while the second WLAN radio receives the fifteenth data. The scheduler circuit outputs a sixth signal to the second WLAN radio and the third WLAN radio in a seventh mode in which the second WLAN radio is transmitting sixteenth data and the third WLAN radio is transmitting seventeenth data and the first WLAN radio is receiving eighteenth data, the sixth signal causing the second WLAN radio and the third WLAN radio to change the transmit power level to the second level. The second WLAN radio transmit the sixteenth data at the second level and the third WLAN radio transmits the seventeenth data at the second level while the first WLAN radio receives the eighteenth data. The scheduler circuit outputs a seventh signal to the first WLAN radio in an eighth mode in which the first WLAN radio is transmitting nineteenth data and the second WLAN radio is receiving twentieth data and the third WLAN radio is receiving twenty-first data, the seventh signal causing the first WLAN radio to change the transmit power level to the second level. The first WLAN radio transmits the nineteenth data at the second level while the second WLAN radio receives the twentieth data and the third WLAN radio receives the twenty-first data.

In another embodiment, the scheduler circuit receives a first state signal from the first WLAN radio, receives a second state signal from the second WLAN radio, and transitions into the first mode using the first state signal and the second state signal. The scheduler circuit receives an energy detect level signal from a host processor. The scheduler circuit outputs an override level signal to the first WLAN radio and second WLAN radio in the first mode, the first signal and the override level signal collectively causing the first WLAN radio to change the first CCA-ED threshold to a fifth CCA-ED threshold that is different than the second CCA-ED threshold and collectively causing the second WLAN radio to change the third CCA-ED threshold to a sixth CCA-ED threshold that is different than the fourth CCA-ED threshold.

In another embodiment, the scheduler circuit receives a first state signal from the first WLAN radio, receives a second state signal from the second WLAN radio, and transitions into the third mode using the first state signal and the second state signal. The scheduler circuit receives a control signal from a host processor and transitions from the third mode to a fourth mode using the first state signal, the second state signal, and the control signal. The scheduler circuit outputs a fourth signal to the first WLAN radio in the fourth mode in which the first WLAN radio is transmitting the fifth data and the second WLAN radio is receiving the sixth data, the fourth signal causing the first WLAN radio to change a transmit power level from a first level to a second level that is less than the first level, wherein the first WLAN radio transmits the fifth data at the second transmit power while the second WLAN radio receives the sixth data.

In another embodiment, the scheduler circuit receives a first state signal from the first WLAN radio, receives a second state signal from the second WLAN radio, and transitions into the second mode using the first state signal and the second state signal. The scheduler circuit outputs a fourth signal to the second WLAN radio in the fourth mode in which the first WLAN radio is receiving the third data and the second WLAN radio is transmitting the fourth data, the fourth signal causing the second WLAN radio to change a transmit power level from a first level to a second level that is less than the first level, wherein the second WLAN radio transmits the fourth data at the second transmit power while the first WLAN radio receives the third data.

Figure 2:
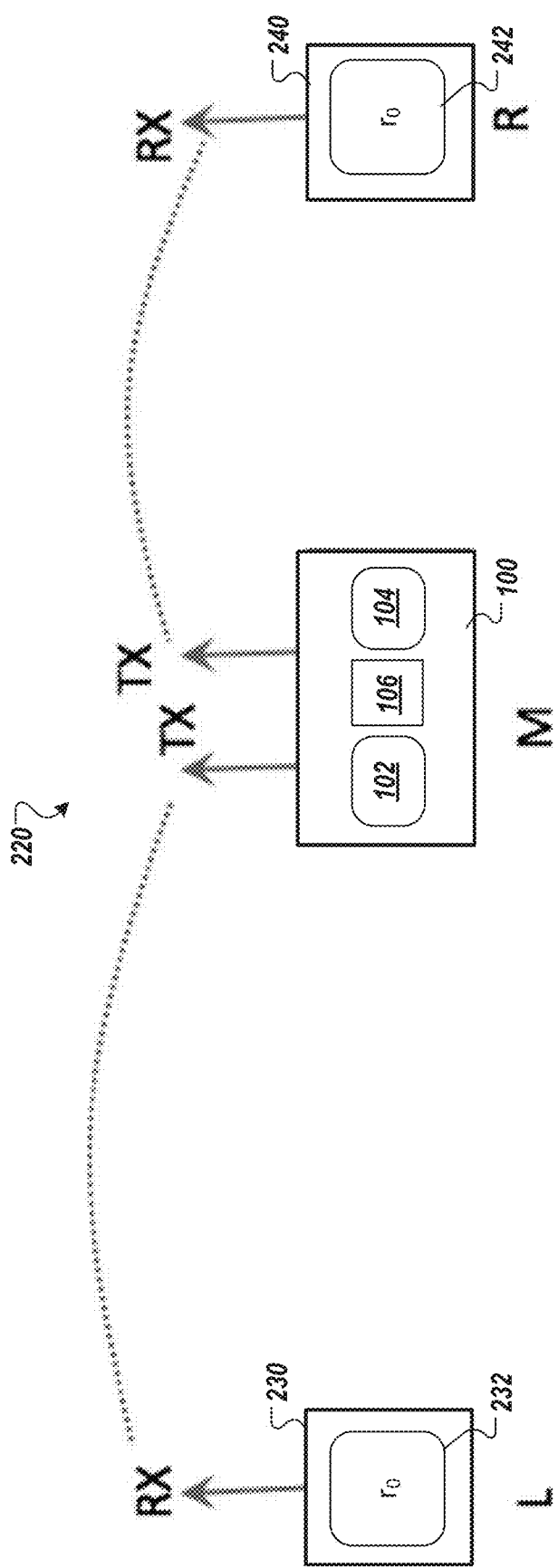
FIG. 2 illustrates a transmit-transmit (TX-TX) mode of the multi-radio device according to one embodiment.

FIG. 2 illustrates a transmit-transmit (TX-TX) mode 220 of the multi-radio device 100 according to one embodiment. The multi-radio device 100 include the first WLAN radio 102, the WLAN radio 104, and the multi-radio transmit scheduler circuit 106 to control transmissions by the first WLAN radio 102 and the second WLAN radio 104 using control signals as described above with respect to FIG. 1. The multi-radio device 100 is in the TX-TX mode 220 in which the first WLAN radio 102 and the second WLAN radio 104 transmit data concurrently. For example, the first WLAN radio 102 is transmitting first data to a second device 230 with a radio 232 and the second WLAN radio 104 is transmitting second data to a third device 24 with a radio 242. In the TX-TX mode 220, the multi-radio transmit scheduler circuit 106, outputs a first signal to the first WLAN radio 102 and the second WLAN radio 104. The first signal increases a first CCA-ED threshold of the radios to a second CCA-ED threshold that is higher than the first CCA-ED threshold. That is, the first CCA-ED threshold can be a first specified value and the second CCA-ED threshold can be a second specified value that is greater than the first specified value. These values can be stored in programmable registers of the radio. The CCA-ED thresholds can be the same values for the two radios or each radio can have its own CCA-ED thresholds.

Figure 3:
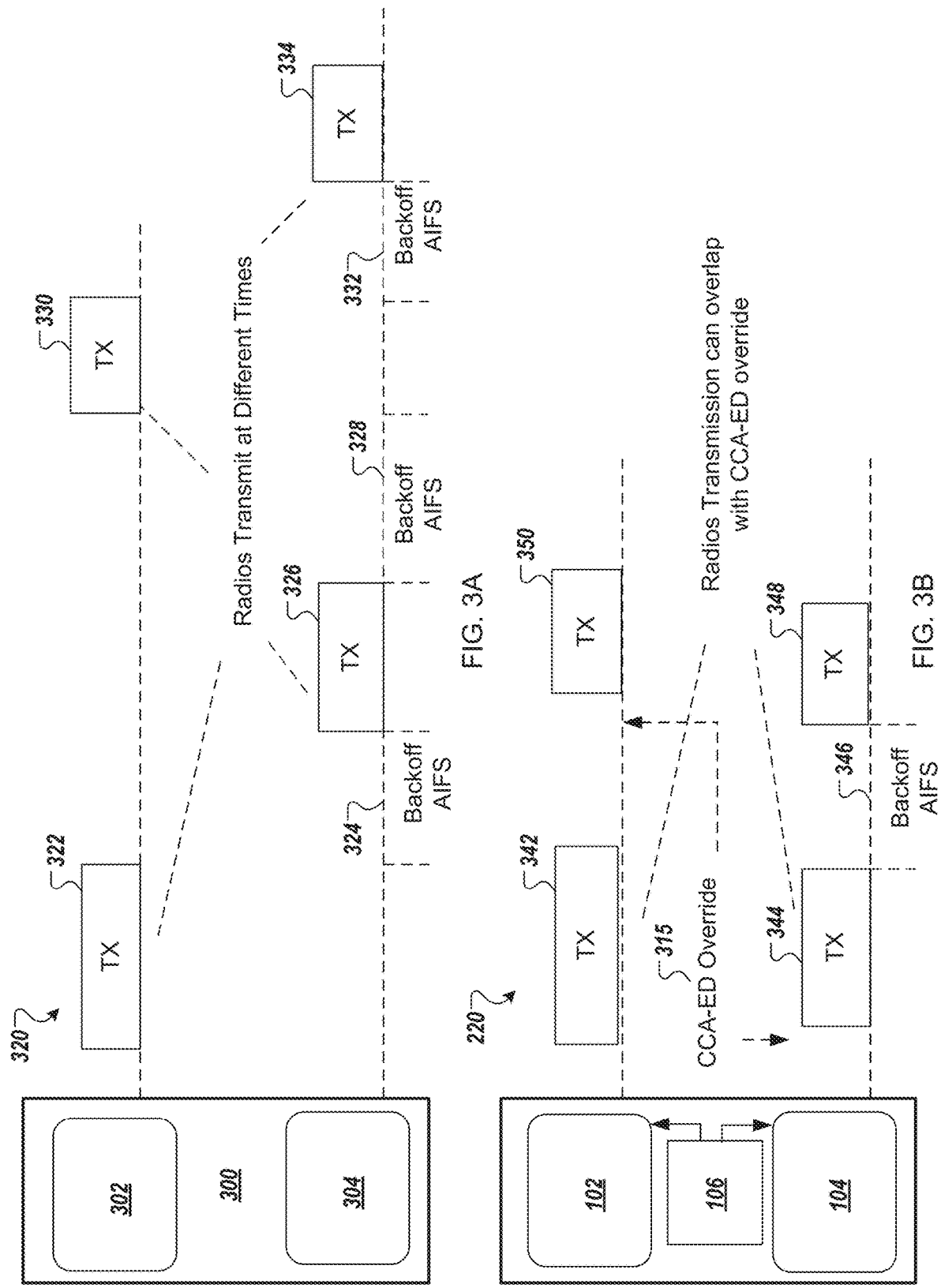
FIG. 3A is a timing diagram of a TX-TX mode of a multi-radio device with full back-off durations after transmission by the radios according to one implementation.
FIG. 3B is a timing diagram illustrating concurrent transmission by multiple radios of the multi-radio device with the multi-radio transmit scheduler circuit in the TX-TX mode according to one embodiment.

FIG. 2 illustrates the behavior of the multi-radio device 100 when both radios are attempting to transmit at the same time or attempting to transmit when another radio's transmission is on-going. In the absence of proposed scheme in a conventional multi-radio device, once one radio is transmitting, the other radio defers transmitting upon detecting a false CCA due to ACI energy as described herein. That is the packet exchange of the second WLAN radio 104 is deferred upon detecting the CCA due to the ACI energy caused by the first WLAN radio 102, as illustrated in a TX-TX mode 320 of a multi-radio device 300 in FIG. 3A.

FIG. 3A is a timing diagram of a TX-TX mode 320 of a multi-radio device 300 with full back-off durations after transmission by the radios according to one implementation. The multi-radio device 300 includes a first WLAN radio 302 and a second WLAN radio 304. The first WLAN radio 302 transmits first data in a first TX frame duration 322. The second WLAN radio 304 determines that the first WLAN radio 302 is transmitting and is prevented from transmitting until after completion of the first TX frame duration 322 plus a backoff AIFS 324. This can be due the second WLAN radio 304 detecting a false CCA due to ACI energy from the first data transmitted by the first WLAN radio 302 during the first TX frame duration 322. After the backoff AIFS 324, the second WLAN radio 304 transmits second data in a second TX frame duration 326. The first WLAN radio 302 determines that the second WLAN radio 304 is transmitting and is prevented from transmitting until after completion of the second TX frame duration 326 plus a backoff AIFS 328. After the backoff AIFS 328, the first WLAN radio 302 transmits third data in a third TX frame duration 330. The second WLAN radio 304 waits until after a backoff AIFS 332 before transmitting fourth data in a fourth TX frame duration 334. Thus, the radios 302 and 304 of the conventional multi-radio device 300 transmit data at different times.

In contrast, using the multi-radio transmit scheduler circuit 106, the moment a transmission on one radio begins, the other radios in the multi-radio device 100 are requested to increase their CCA-ED thresholds via the CCA-ED override, as illustrated and described below with respect to FIG. 3B. This allows other radios to not assert the false CCA during this time period and can initiate their own transmission. This increases the overall wireless capacity available.

FIG. 3B is a timing diagram illustrating concurrent transmission by multiple radios of the multi-radio device 100 with the multi-radio transmit scheduler circuit 106 in the TX-TX mode 220 according to one embodiment. In the TX-TX mode 220, the first WLAN radio 102 transmits first data in a first TX frame duration 322. As the first WLAN radio 102 transmits first data, the multi-radio transmit scheduler circuit 106 asserts the CCA-ED override 315 that increases the CCA-ED thresholds of the second WLAN radio 104. Although the first WLAN radio 102 is transmitting, the second WLAN radio 104 is not prevented from transmitting and can transmit second data in a second transmit frame duration 344 without a backoff AIFS. That is, the radios' transmissions can overlap using the CCA-ED override 315. In some cases, the second WLAN radio 104 can transmit third data in a third transmit frame duration 348 after a backoff AIFS 346. Once the second WLAN radio 104 initiates a transmission, the multi-radio transmit scheduler circuit 106 asserts the CCA-ED override 315 that increases the CCA-ED threshold of the first WLAN radio 102. Although the second WLAN radio 104 is transmitting, the first WLAN radio 102 is not prevented from transmitting and can transmit fourth data in a fourth transmit frame duration 350 without a backoff AIFS. That is, the radios' transmissions can overlap using the CCA-ED override 315.

In other cases, a radio that is receiving data can be affected by an attempt to transmit by another radio in the multi-radio device, such as in a RX-TX mode. This can also result in waste in the available wireless capacity, as illustrated in FIG. 5A. Using the multi-radio transmit scheduler circuit 106, the multi-radio device 100 can increase the available wireless capacity in a RX-TX mode or a TX-RX mode as described below with respect to FIG. 4.

Figure 4:
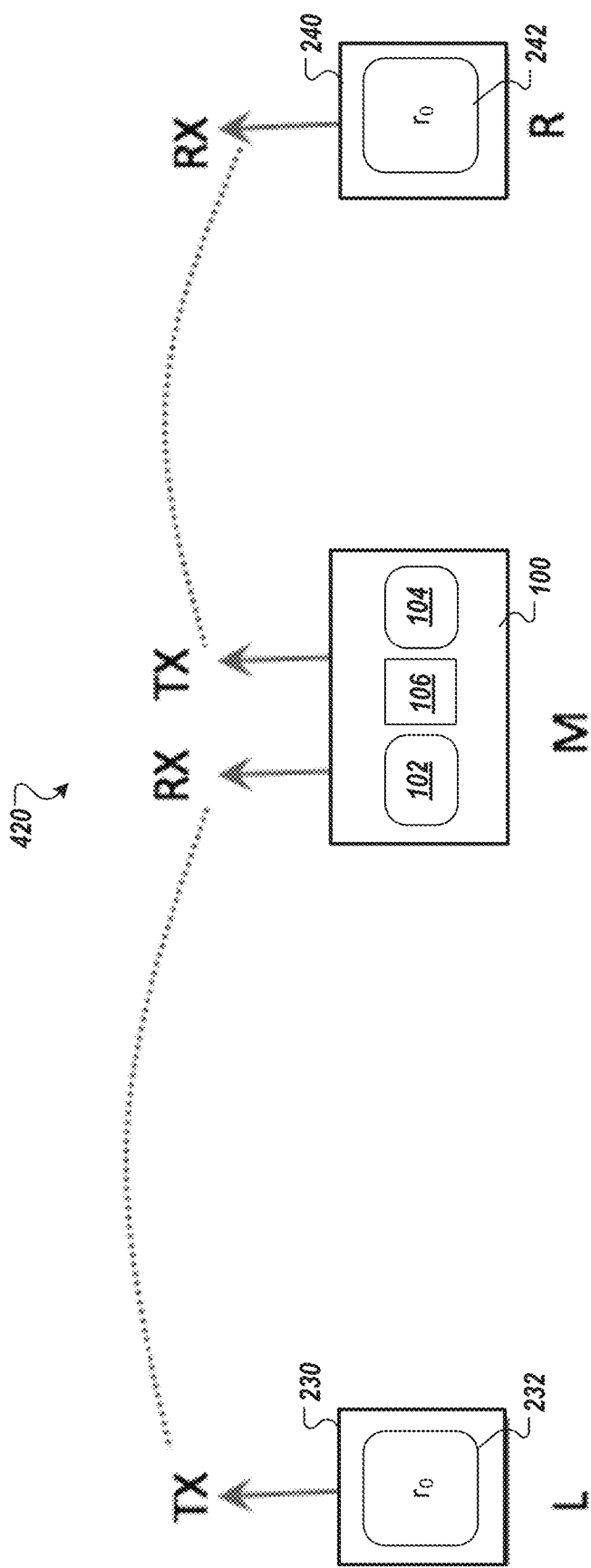
FIG. 4 illustrates a receive-transmit (RX-TX) mode or a TX-RX mode of the multi-radio device according to one embodiment.

FIG. 4 illustrates a receive-transmit (RX-TX) mode 420 or a TX-RX mode of the multi-radio device 100 according to one embodiment. The multi-radio device 100 include the first WLAN radio 102, the WLAN radio 104, and the multi-radio transmit scheduler circuit 106 to control transmissions by the first WLAN radio 102 and the second WLAN radio 104 using control signals as described above with respect to FIG. 1. The multi-radio device 100 is in the RX-TX mode 420 in which the first WLAN radio 102 receives data and the second WLAN radio 104 would like to initiate transmission of data. For example, the first WLAN radio 102 is receiving first data from the radio 232 of the second device 230 and the second WLAN radio 104 would like to transmit second data to the third device 240 via the radio 242. In the RX-TX mode 420, the multi-radio transmit scheduler circuit 106, outputs a second signal to the second WLAN radio 104. The second signal defers transmission of the second data by the second WLAN radio 104 until after the first WLAN radio completes reception of the data, such as after PIFS. PIFS is a smaller duration than the full backoff AIFS. The second signal can be the CCA assert signal described above with respect to FIG. 1. The CCA assert can control the second WLAN radio 104 to not transmit as long as the CCA assert signal is high. When the CCA assert signal goes low, the second WLAN radio 104 can wait the PIFS and initiate transmission of the second data to the third device 340.

FIG. 4 illustrates the behavior of the multi-radio device 100 when a first radio is receiving data and a second radio is attempting to transmit at the same time as the first radio's receiving is on-going. In the absence of proposed scheme in a conventional multi-radio device, once a first radio is receiving and a second radio starts to transmit, the reception by the first radio goes bad due to the transmission by the second radio, as illustrated in a RX-TX mode 520 of the conventional multi-radio device 300 in FIG. 5A.

FIG. 5A is a timing diagram illustrating bad reception of data on a first radio caused by transmission of data by a second radio in a RX-TX mode 520 of the conventional multi-radio device 300 according to one implementation. The first WLAN radio 302 receives first data in a first RX frame duration 522. During the first RX frame duration 522, the second WLAN radio 304 transmits second data in a TX frame duration 524. The reception of data by the first WLAN radio 302 goes bad due to the transmission by the second WLAN radio 304, as illustrated with the hashing in the first RX frame duration 522. This reception can go bad due to ACI energy caused by the transmission by the second WLAN radio 304. After a backoff AIFS 526, the second WLAN radio 302 receives third data in a third RX frame duration 528. During the third RX frame duration 528, the first WLAN radio 302 transmits fourth data in a fourth TX frame duration 530. The reception of data by the second WLAN radio 304 goes bad due to the transmission by the first WLAN radio 302, as illustrated with the hashing in the third RX frame duration 528. This reception can go bad due to ACI energy caused by the transmission by the first WLAN radio 302. Thus, the radios 302 and 304 of the conventional multi-radio device 300 reduce the available wireless capability due to the bad reception of data.

In contrast, using the multi-radio transmit scheduler circuit 106, the moment a reception of data begins on one radio, the other radios in the multi-radio device 100 are requested to defer transmission via the CCA assert, as illustrated and described below with respect to FIG. 5B. This allows other radios to defer their own transmissions where ACI energy would impact the receiving radio. The other radios can initiate their transmission after a duration that is less than a full backoff duration. This increases the overall wireless capacity available.

FIG. 5B is a timing diagram illustrating reception of data on a first radio and deferred transmission of data by a second radio of the multi-radio device with the multi-radio transmit scheduler circuit 106 in a RX-TX mode 420 according to one embodiment. In the RX-TX mode 420, the first WLAN radio 102 receives first data in a first RX frame duration 542. As the first WLAN radio 102 receives first data, the multi-radio transmit scheduler circuit 106 asserts the CCA assert 517 that prevents the second WLAN radio 104 from transmitting. The CCA assert 517 defers transmissions by the second WLAN radio 104 until after the first RX frame duration 542 completes plus PIFS 544, which is less than the backoff AIFS 526 of FIG. 5A. After PIFS 544, the second WLAN radio 104 can transmit second data during a TX frame duration 546. Once the second WLAN radio 104 initiates a transmission, the multi-radio transmit scheduler circuit 106 asserts the CCA-ED override 515 that increases the CCA-ED threshold of the first WLAN radio 102. Although the second WLAN radio 104 is transmitting, the first WLAN radio 102 is not prevented from transmitting and can transmit third data in a third transmit frame duration 548 without a backoff AIFS. That is, the radios' transmissions can overlap using the CCA-ED override 515.

In some cases, the second WLAN radio 104 can receive fourth data in a fourth RX frame duration 550. Once the second WLAN radio 104 initiates a transmission, the multi-radio transmit scheduler circuit 106 asserts the CCA-ED override 315 that increases the CCA-ED threshold of the first WLAN radio 102. Although the second WLAN radio 104 is transmitting, the first WLAN radio 102 is not prevented from transmitting and can transmit fourth data in a fourth transmit frame duration 350 without a backoff AIFS. That is, the radios' transmissions can overlap using the CCA-ED override 315. As the second WLAN radio 104 receives fourth data, the multi-radio transmit scheduler circuit 106 asserts the CCA assert 517 that prevents the first WLAN radio 102 from transmitting. The CCA assert 517 defers transmissions by the first WLAN radio 102 until after the fourth RX frame duration 550 completes plus PIFS 552, which is less than the backoff AIRS 526 of FIG. 5A. After PIFS 552, the second WLAN radio 104 can transmit fifth data during a fifth TX frame duration 554.

Figure 6:
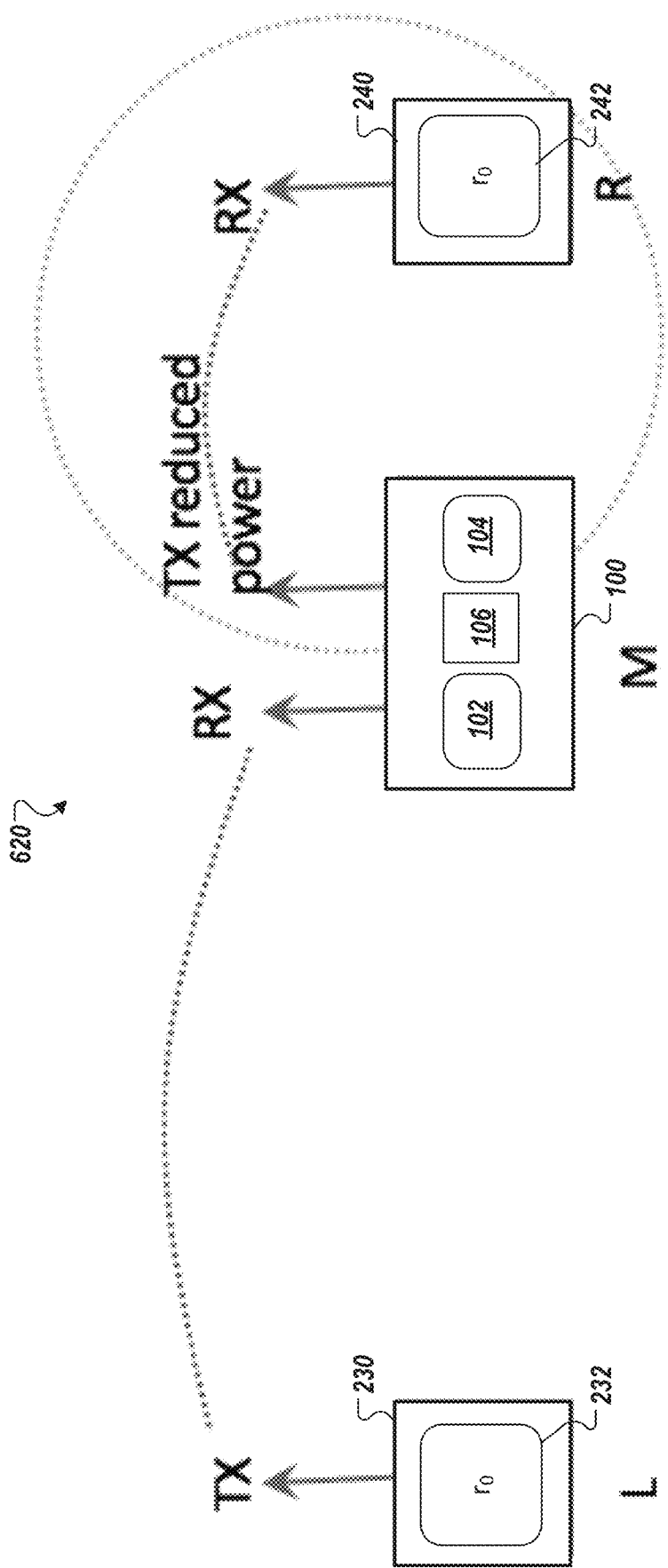
FIG. 6 illustrates a RX-TX mode or a TX-RX mode of the multi-radio device with reduced transmit power according to one embodiment.
Figure 7:
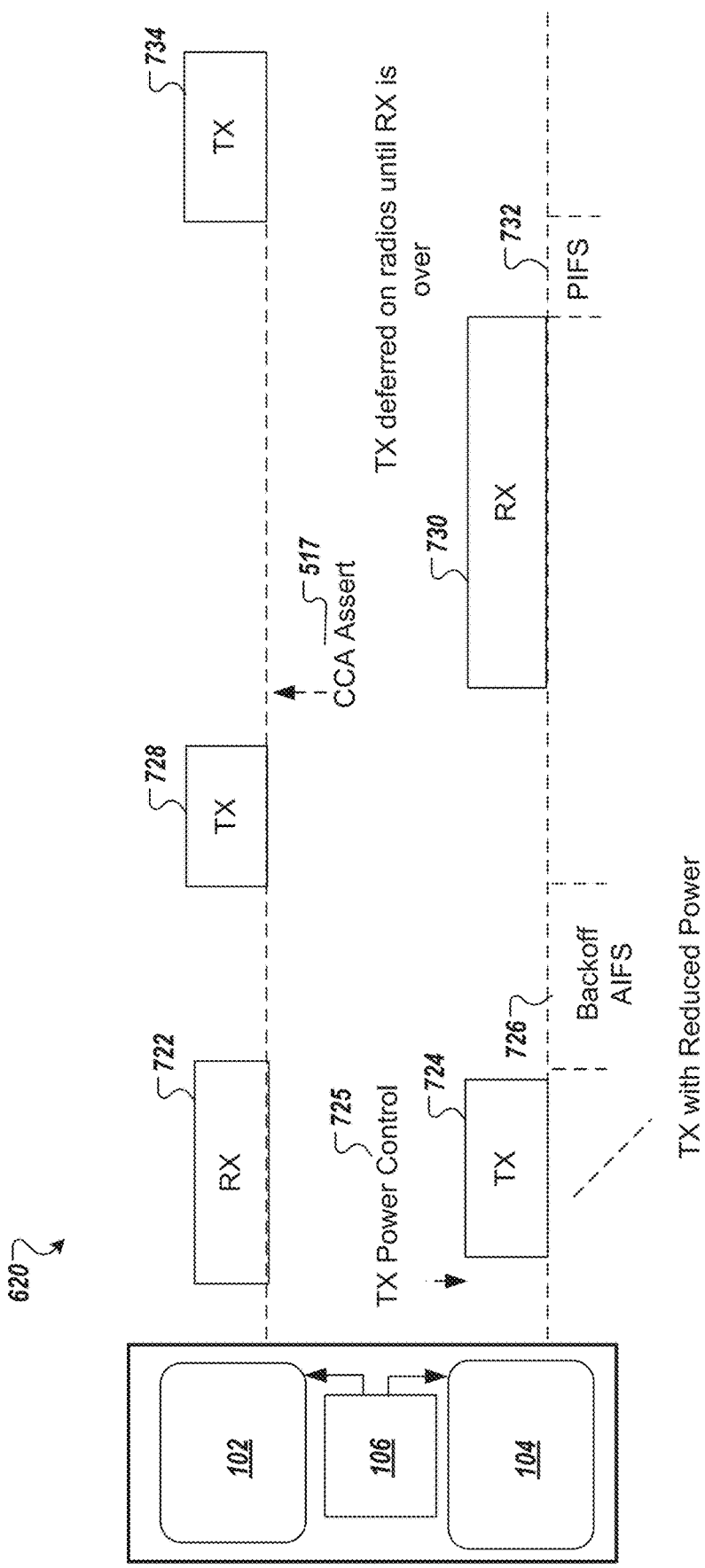
FIG. 7 is a timing diagram illustrating reception of data on a first radio and reduced-power transmission of data by a second radio of the multi-radio device with the multi-radio transmit scheduler circuit in a RX-TX mode according to one embodiment.

FIG. 6 illustrates a RX-TX mode 620 or a TX-RX mode of the multi-radio device 100 with reduced transmit power according to one embodiment. The RX-TX mode 620 is similar to the RX-TX mode 420 of FIG. 4 except that instead of using the CCA assert signal to defer transmission by the second WLAN radio 104, the multi-radio transmit scheduler circuit 106 using a transmit power control signal to reduce the transmit power of the second WLAN radio 104. The RX-TX mode 620 occurs when the second WLAN radio 104 of the multi-radio device 100 is requested to reduce transmit power to prevent degraded SINR of the first WLAN radio 102 during reception by the first WLAN radio 102. This can be used when the third device 240 and the multi-radio device 100 are close to each other such that the link budget between them allows reduction in the transmit power. Devices can be considered close based on the receive signal strength indicator (RSSI) measurements. So, instead of CCA assert, the radio attempting to transmit uses a minimum transmit power to deliver the frame concurrent with radio that is receiving data. Since ACI interference highly depend on the transmit power being used, by using a minimum value that can successfully deliver other frame, the receive radio's SINR is not degraded and hence able to receive correctly. This also results in more wireless capacity by the multi-radio device 100. The multi-radio transmit scheduler circuit 106 allows this mode to be chosen on-the-fly with the input ctrl signal 111, as described above with respect to FIG. 1. As seen in FIG. 7, the moment ctrl pin is held low, the multi-radio transmit scheduler circuit 106 can revert back to the CCA assert based transmit deferral.

FIG. 7 is a timing diagram illustrating reception of data on a first radio and reduced-power transmission of data by a second radio of the multi-radio device with the multi-radio transmit scheduler circuit 106 in a RX-TX mode 620 according to one embodiment. In the RX-TX mode 620, the first WLAN radio 102 receives first data in a first RX frame duration 722. As the first WLAN radio 102 receives first data, the multi-radio transmit scheduler circuit 106 asserts the TX power control 725 that allows the second WLAN radio 104 to transmit with reduced power. As described above, the multi-radio transmit scheduler 106 can use the TX power control signal 725 to control the second WLAN radio 104 to use a lowest transmit power that can successfully deliver a frame to a receiver. Thus, in the RX-TX mode 620, the second WLAN radio 104 transmits second data in a second TX frame duration 724. After a backoff AIRS 726, the first WLAN radio 102 transmits third data in a third TX frame duration 728.

In some cases, the second WLAN radio 104 receives fourth data in a fourth RX frame duration 730. As the second WLAN radio 104 receives the fourth data, the multi-radio transmit scheduler circuit 106 asserts the CCA assert 517 that prevents the first WLAN radio 102 from transmitting. The CCA assert 517 defers transmissions by the first WLAN radio 102 until after the fourth RX frame duration 730 completes plus PIFS 732, which is less than the backoff AIRS 526 of FIG. 5A. After PIFS 732, the first WLAN radio 102 can transmit fifth data during a fifth TX frame duration 734. Once the first WLAN radio 102 initiates a transmission, the multi-radio transmit scheduler circuit 106 can assert the CCA-ED override (not illustrated in FIG. 7) that increases the CCA-ED threshold of the second WLAN radio 102. Although the first WLAN radio 102 is transmitting, the second WLAN radio 104 is not prevented from transmitting and can transmit additional data without a backoff AIFS. That is, the radios' transmissions can overlap using the CCA-ED override.

The ability to switch between TX power control 725 and or CCA assert 517 can be determined by the available link budget between the transmitter of the second WLAN radio 104 and the receiver of the radio with which the second WLAN radio is communicating, for example, when the devices are pretty close to each other in a point-to-point topology. The ctrl pin of the multi-radio transmit scheduler circuit 106, when held high, selects the TX power control mode (e.g., 725) for all operations. When ctrl pin is held low, the CCA assert mode (e.g., 517) is selected, which can also the default mode when ctrl signal is not present or held low. As described above, a high-level application can determine the link budget and can choose to select CCA assert mode or TX power control mode using a control signal at the ctrl pin.

Figure 8:
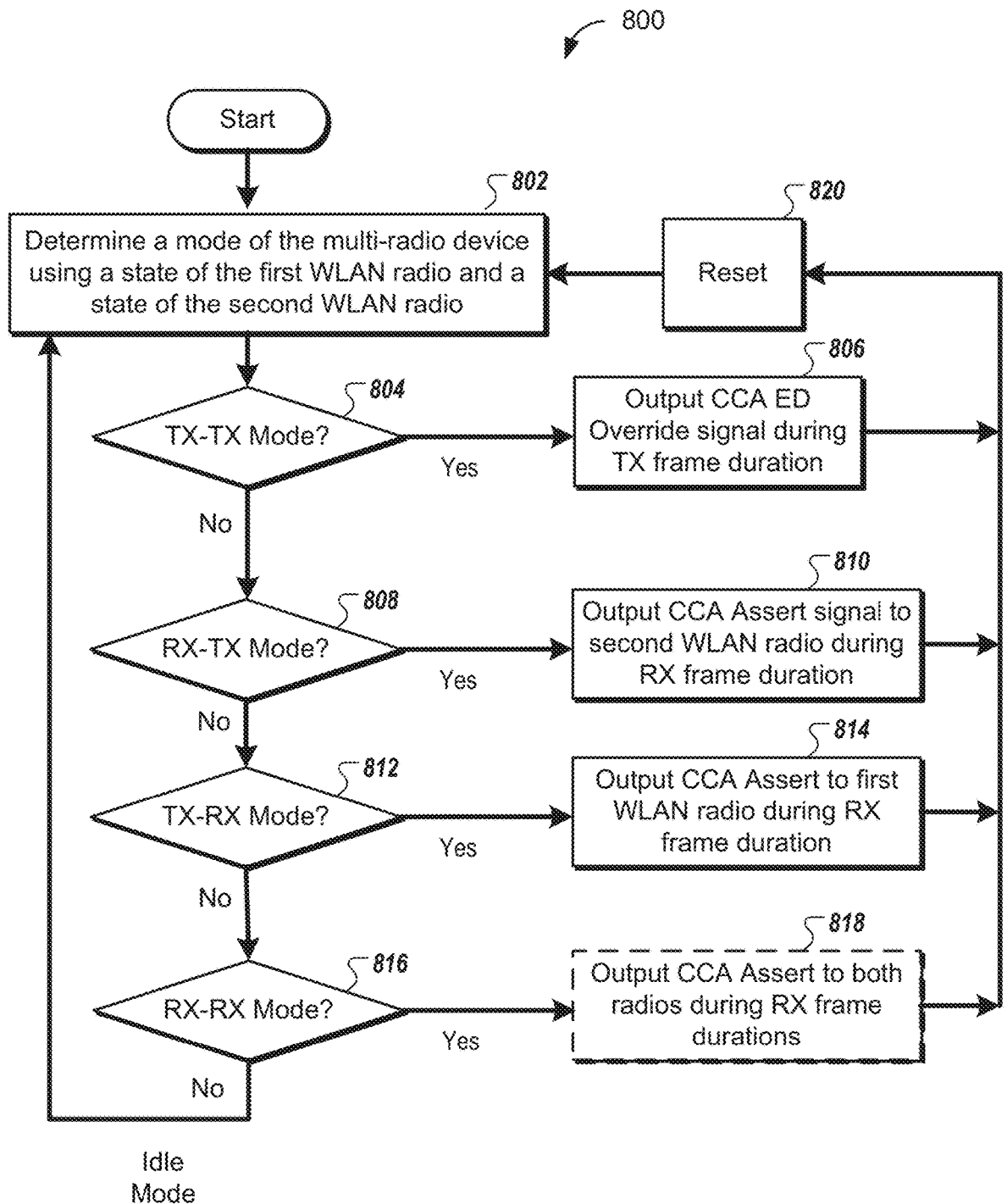
FIG. 8 is a flow diagram illustrating a method of operating a multi-radio device with a multi-radio transmit scheduler circuit according to an embodiment.

FIG. 8 is a flow diagram illustrating a method 800 of operating a multi-radio device with a multi-radio transmit scheduler circuit according to an embodiment. The method 800 may be performed by processing logic that comprises hardware (e.g., circuitry, dedicated logic, programmable logic, microcode, etc.), software, firmware, or a combination thereof. In one embodiment, method 800 may be performed by any of the multi-radio devices described herein and illustrated with respect to FIGS. 1-7.

Referring to FIG. 8, the method 800 begins by the processing logic determining a mode of the multi-radio device using a state of a first wireless local area network (WLAN) radio and a state of a second WLAN radio (block 802). At block 804, the processing logic determines if the mode is the TX-TX mode. If so, the processing logic outputs a CCA-ED override signal during a TX frame duration (block 806). The CCA-ED override signal can be output to the first WLAN radio and the second WLAN radio. If the first WLAN radio initiates transmission before the second WLAN radio, the processing logic outputs the CCA-ED override signal to the second WLAN radio and the second WLAN radio can still transmit data concurrently with the first WLAN radio because of the CCA-ED override signal. Similarly, if the second WLAN radio initiates transmission before the first WLAN radio, the processing logic outputs the CCA-ED override signal to the first WLAN radio and the first WLAN radio can still transmit data concurrently with the second WLAN radio because of the CCA-ED override signal. After the TX frame duration, the processing logic resets (block 820) and returns to block 802. If at block 804, the processing logic determines that the multi-radio device is not in the TX-TX mode, the processing logic determines whether the multi-radio device is in a RX-TX mode at block 808. If so, the processing logic outputs a CCA assert signal to the second WLAN radio during a RX frame duration of the first WLAN radio (block 810). The CCA assert signal prevents the second WLAN radio from transmitting data, such as during the receive frame duration of the first WLAN radio. The CCA assert signal can prevent ACI energy leakage at the first WLAN radio caused by the second WLAN radio during the receive frame duration. After the RX frame duration at block 810, the processing logic resets (block 820) and returns to block 802.

If at block 808, the processing logic determines that the multi-radio device is not in the RX-TX mode, the processing logic determines whether the multi-radio device is in a TX-RX mode at block 812. If so, the processing logic outputs a CCA assert signal to the first WLAN radio during a RX frame duration of the second WLAN radio (block 814). The CCA assert signal prevents the first WLAN radio from transmitting data, such as during the receive frame duration of the second WLAN radio. The CCA assert signal can prevent ACI energy leakage at the second WLAN radio caused by the first WLAN radio during the receive frame duration. After the RX frame duration at block 814, the processing logic resets (block 820) and returns to block 802.

If at block 812, the processing logic determines that the multi-radio device is not in the TX-RX mode, the processing logic determines whether the multi-radio device is in an RX-RX mode (block 816). If so, the processing logic outputs a CCA assert signal to both radios during the RX frame durations (optional block 818). This prevents either one of the radios from transmitting, but allows receiving data concurrently. After the RX frame durations at block 818, the processing logic resets (block 820) and returns to block 802. In some cases, the radios can be connected to directional antennas and can operate normally in RX-RX mode. In other cases, the radios can be connected to omnidirectional antennas and can still suffer from collisions.

If at block 820, the processing logic determines that the multi-radio device is not in the RX-RX mode at block 816, the processing logic determines that the multi-radio device is in an idle mode and returns to block 802.

In another embodiment, instead of determining whether the multi-radio device is in the RX-RX mode, the processing logic exhibits no change and waits for the completion of the RX frame duration and resets (block 820) and returns to block 802.

In other embodiments, additional modes can be added to the method 800, for example to accommodate more than two radios as described herein.

In another embodiment, the processing logic determines a mode of the multi-radio device using a state of a first WLAN radio and a state of a second WLAN radio. The processing logic outputs a first signal to the first WLAN radio and the second WLAN radio in a TX-TX mode in which the first WLAN radio and the second WLAN radio transmit data concurrently. The first signal can be a CCA-ED override signal that increases a first CCA-ED threshold of the first WLAN radio and the second WLAN radio to a second CCA-ED threshold. The processing logic outputs a second signal to the second WLAN radio in a RX-TX mode in which the first WLAN radio receives data and the second WLAN radio transmits data. The second signal can be a CCA assert signal that defers transmission by the second WLAN radio until after the first WLAN radio completes reception of the data. The processing logic outputs the second signal to the first WLAN radio in a TX-RX mode in which the first WLAN radio transmits data and the second WLAN radio receive data. The second signal can be a CCA assert signal that defers transmission by the first WLAN radio until after the second WLAN radio completes reception of the data.

In a further embodiment, the processing logic outputs a fourth signal to the second WLAN radio in the RX-TX mode (instead of the second signal at block 810 or in a separate instance of the RX-TX mode). The fourth signal can be a TX power control signal that reduces a transmit power of the second WLAN radio while the first WLAN radio receives data. The processing logic can output a fifth signal to the second WLAN radio in the TX-RX mode (instead of the second signal at block 814 or in a separate instance of the TX-RX mode). The fifth signal can be a TX power control signal that reduces a transmit power of the first WLAN radio while the second WLAN radio receives data.

In a further embodiment, the multi-radio device includes a third WLAN radio and the processing logic determines a mode using the states of the three WLAN radios. The processing logic outputs the first signal to the first WLAN radio, the second WLAN radio, and the third WLAN radio in a TX-TX-TX mode in which the first WLAN radio, the second WLAN radio, and the third WLAN radio transmit data concurrently. The first signal can be a CCA-ED override signal that increases the first CCA-ED threshold of the first WLAN radio, the second WLAN radio, and the third WLAN radio to the second CCA-ED threshold. The processing logic outputs the second the second signal to the first WLAN radio and the second WLAN radio in a TX-TX-RX mode in which the first WLAN radio and the second WLAN radio transmit data and the third WLAN radio receives data. The second signal defers transmissions by the first WLAN radio and the second WLAN radio until after the third WLAN radio completes reception of the data. The processing logic outputs the second signal to the first WLAN radio and the third WLAN radio in a TX-RX-TX mode in which the first WLAN radio and the third WLAN radio transmit data and the second WLAN radio receives data. The second signal defers transmissions by the first WLAN radio and the third WLAN radio until after the second WLAN radio completes reception of the data. The processing logic outputs the second signal to the second WLAN radio and the third WLAN radio in a RX-TX-TX mode in which the second WLAN radio and the third WLAN radio transmit data and the first WLAN radio receives data, the second signal deferring transmissions by the third WLAN radio and the third WLAN radio until after the first WLAN radio completes reception of the data. The processing logic outputs the second signal to the first WLAN radio in a TX-RX-RX mode in which the first WLAN radio transmit data and the second WLAN radio and the third WLAN radio receive data, the second signal deferring transmissions by the first WLAN radio until after the second WLAN radio completes reception of the data and after the third WLAN radio completes reception of the data.

In further embodiments, the processing logic outputs the second signal to the second WLAN radio in a RX-TX-RX mode in which the second WLAN radio transmit data and the first WLAN radio and the third WLAN radio receive data, the second signal deferring transmissions by the second WLAN radio until after the first WLAN radio completes reception of the data and after the third WLAN radio completes reception of the data. The processing logic outputs the second signal to the third WLAN radio in a receive-receive-transmit mode in which the third WLAN radio transmit data and the first WLAN radio and the second WLAN radio receive data, the second signal deferring transmissions by the third WLAN radio until after the first WLAN radio completes reception of the data and after the second WLAN radio completes reception of the data.

In a further embodiment, the processing logic outputs the first signal to the first WLAN radio, the second WLAN radio, and a third WLAN radio in a TX-TX-TX mode in which the first WLAN radio, the second WLAN radio, and the third WLAN radio transmit data concurrently, the first signal increasing the CCA-ED threshold of the first WLAN radio, the second WLAN radio, and the third WLAN radio. The processing logic outputs a fourth signal to the first WLAN radio and the second WLAN radio in a TX-TX-RC mode in which the first WLAN radio and the second WLAN radio transmit data and the third WLAN radio receives data, the fourth signal reducing a transmit power of the first WLAN radio and the second WLAN radio while the third WLAN radio receives data. The processing logic outputs the fourth signal to the first WLAN radio and the third WLAN radio in a TX-RX-TX mode in which the first WLAN radio and the third WLAN radio transmit data and the second WLAN radio receives data, the fourth signal reducing a transmit power of the first WLAN radio and the third WLAN radio while the second WLAN radio receives data. The processing logic outputs the fourth signal to the second WLAN radio and the third WLAN radio in a RX-TX-TX mode in which the second WLAN radio and the third WLAN radio transmit data and the first WLAN radio receives data, the fourth signal reducing a transmit power of the third WLAN radio and the third WLAN radio while the first WLAN radio receives data. The processing logic outputs the fourth signal to the first WLAN radio in a transmit-receive-receive mode in which the first WLAN radio transmit data and the second WLAN radio and the third WLAN radio receive data, the fourth signal reducing a transmit power of the first WLAN radio while the second WLAN radio and the third WLAN radio receives data.

In a further embodiment, the processing logic outputs the fourth signal to the second WLAN radio in a receive-transmit-receive mode in which the second WLAN radio transmit data and the first WLAN radio and the third WLAN radio receive data, the fourth signal reducing a transmit power of the second WLAN radio while the first WLAN radio and the third WLAN radio receives data. The processing logic outputs the fourth signal to the third WLAN radio in a receive-receive-transmit mode in which the third WLAN radio transmit data and the first WLAN radio and the second WLAN radio receive data, the fourth signal reducing a transmit power of the third WLAN radio while the first WLAN radio and the second WLAN radio receives data.

In a further embodiment, the processing logic receives an energy detect level signal from a host processor and outputs an override level signal to the first WLAN radio and second WLAN radio in the transmit-transmit mode, the first signal and the override level signal increasing the CCA-ED threshold of the first WLAN radio and the second WLAN radio to a third CCA-ED threshold that is different than the second CCA-ED threshold.

In another embodiment, the processing logic receives a control signal from a host processor and outputs a fourth signal to the first WLAN radio in the receive-transmit mode instead of the second signal, the fourth signal reducing a transmit power of the first WLAN radio while the second WLAN radio receives data.

In another embodiment, the processing logic receives a control signal from a host processor and outputs a fourth signal to the second WLAN radio in the receive-transmit mode instead of the second signal, the fourth signal reducing a transmit power of the second WLAN radio while the first WLAN radio receives data.

Figure 9:
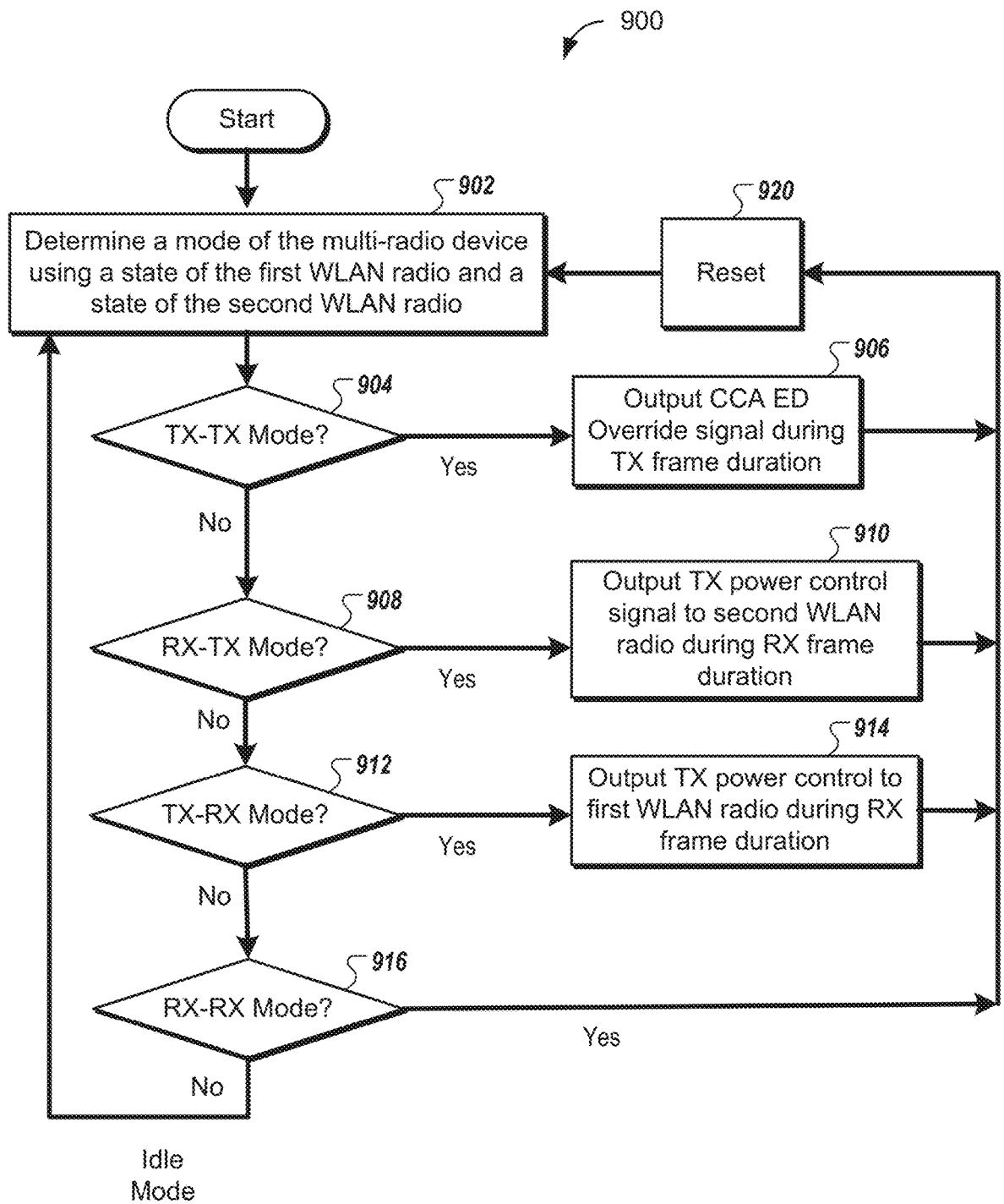
FIG. 9 is a flow diagram illustrating a method of operating a multi-radio device with a multi-radio transmit scheduler circuit according to an embodiment.

FIG. 9 is a flow diagram illustrating a method 900 of operating a multi-radio device with a multi-radio transmit scheduler circuit according to an embodiment. The method 900 may be performed by processing logic that comprises hardware (e.g., circuitry, dedicated logic, programmable logic, microcode, etc.), software, firmware, or a combination thereof. In one embodiment, method 900 may be performed by any of the multi-radio devices described herein and illustrated with respect to FIGS. 1-7.

Referring to FIG. 9, the method 900 begins by the processing logic determining a mode of the multi-radio device using a state of a first wireless local area network (WLAN) radio and a state of a second WLAN radio (block 902). At block 904, the processing logic determines if the mode is the TX-TX mode. If so, the processing logic outputs a CCA-ED override signal during a TX frame duration (block 906). The CCA-ED override signal can be output to the first WLAN radio and the second WLAN radio. If the first WLAN radio initiates transmission before the second WLAN radio, the processing logic outputs the CCA-ED override signal to the second WLAN radio and the second WLAN radio can still transmit data concurrently with the first WLAN radio because of the CCA-ED override signal. Similarly, if the second WLAN radio initiates transmission before the first WLAN radio, the processing logic outputs the CCA-ED override signal to the first WLAN radio and the first WLAN radio can still transmit data concurrently with the second WLAN radio because of the CCA-ED override signal. After the TX frame duration, the processing logic resets (block 920) and returns to block 902. If at block 904, the processing logic determines that the multi-radio device is not in the TX-TX mode, the processing logic determines whether the multi-radio device is in a RX-TX mode at block 908. If so, the processing logic outputs a TX power control signal to the second WLAN radio during a RX frame duration of the first WLAN radio (block 910). The TX power control signal causes the second WLAN radio to transmit data at a reduced transmit power during the receive frame duration of the first WLAN radio. The reduced transmit power can be a minimum power level at which the frame can be successfully communicated. The TX power control signal can reduce ACI energy leakage at the first WLAN radio caused by the second WLAN radio during the receive frame duration. After the RX frame duration at block 910, the processing logic resets (block 920) and returns to block 902.

If at block 908, the processing logic determines that the multi-radio device is not in the RX-TX mode, the processing logic determines whether the multi-radio device is in a TX-RX mode at block 912. If so, the processing logic outputs a TX power control signal to the first WLAN radio during a RX frame duration of the second WLAN radio (block 914). The TX power control signal causes the first WLAN radio to transmit data at a reduced transmit power during the receive frame duration of the second WLAN radio. The reduced transmit power can be a minimum power level at which the frame can be successfully communicated. The TX power control signal can reduce ACI energy leakage at the second WLAN radio caused by the first WLAN radio during the receive frame duration. After the RX frame duration at block 914, the processing logic resets (block 920) and returns to block 902.

If at block 912, the processing logic determines that the multi-radio device is not in the TX-RX mode, the processing logic determines whether the multi-radio device is in an RX-RX mode (block 916). If so, the processing logic can optionally output the TX power control signal to both radios during the RX frame durations. This allows either one of the radios to transmit at a reduced rate. After the RX frame durations at block 916, the processing logic resets (block 920) and returns to block 902. In some cases, the radios can be connected to directional antennas and can operate normally in RX-RX mode. In other cases, the radios can be connected to omnidirectional antennas and can still suffer from collisions.

If at block 920, the processing logic determines that the multi-radio device is not in the RX-RX mode, the processing logic determines that the multi-radio device is in an idle mode and returns to block 902.

In another embodiment, instead of determining whether the multi-radio device is in the RX-RX mode at block 916, the processing logic exhibits no change and waits for the completion of the RX frame duration and resets (block 920) and returns to block 902.

Figure 10:
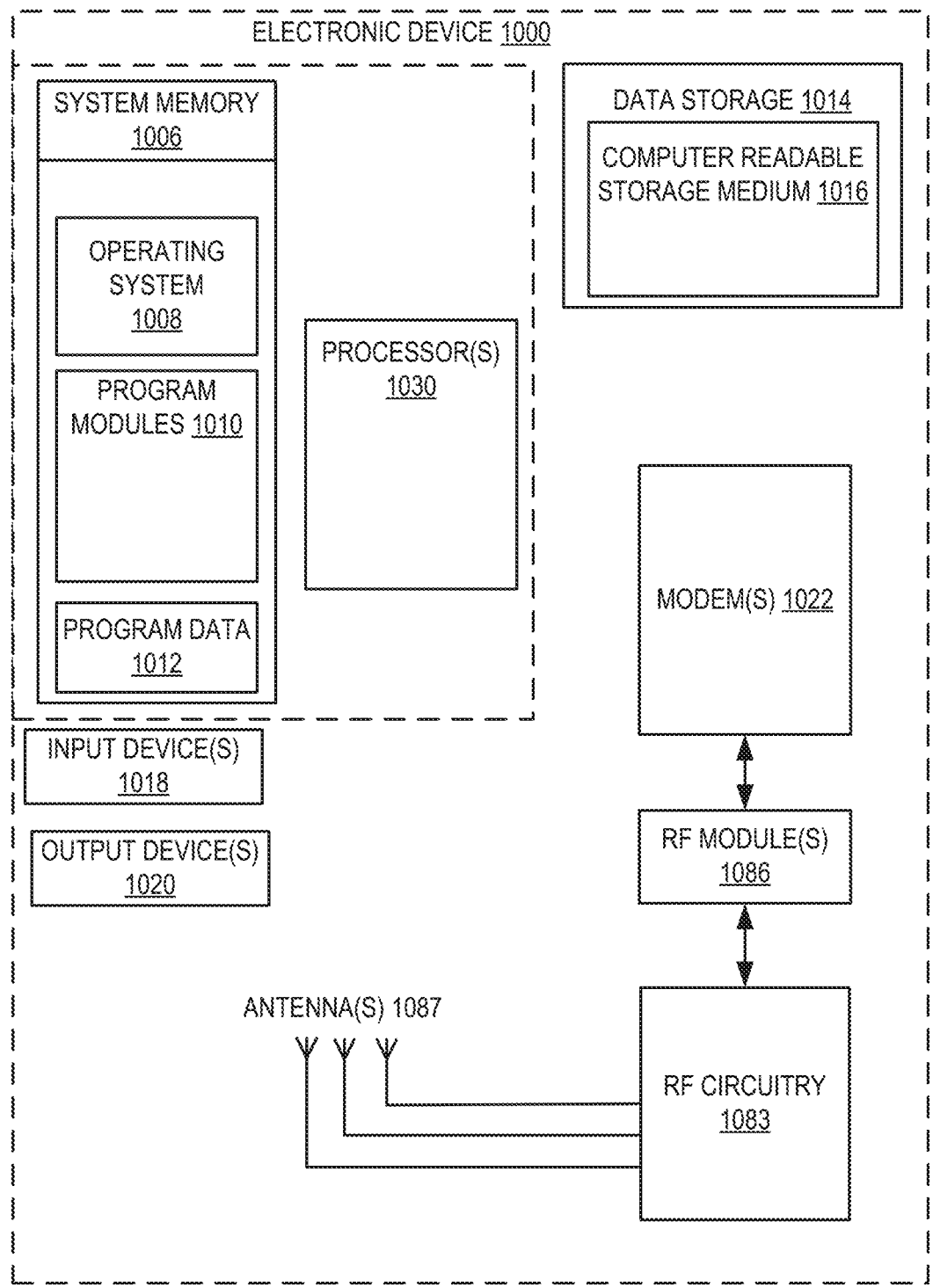
FIG. 10 is a block diagram of a multi-radio device according to one embodiment.

FIG. 10 is a block diagram of a multi-radio device 1000 according to one embodiment. The multi-radio device 1000 may correspond to the multi-radio devices described above with respect to FIGS. 1-7. Alternatively, the multi-radio device 1000 may be other electronic devices as described herein.

The multi-radio device 1000 includes one or more processor(s) 1030, such as one or more CPUs, microcontrollers, field programmable gate arrays, or other types of processors.

The multi-radio device 1000 also includes system memory 1006, which may correspond to any combination of volatile and/or non-volatile storage mechanisms. The system memory 1006 stores information that provides operating system component 1008, various program modules 1010, program data 1012, and/or other components. In one embodiment, the system memory 1006 stores instructions of methods to control operation of the multi-radio device 1000. The multi-radio device 1000 performs functions by using the processor(s) 1030 to execute instructions provided by the system memory 1006.

The multi-radio device 1000 also includes a data storage device 1014 that may be composed of one or more types of removable storage and/or one or more types of non-removable storage. The data storage device 1014 includes a computer-readable storage medium 1016 on which is stored one or more sets of instructions embodying any of the methodologies or functions described herein. Instructions for the program modules 1010 may reside, completely or at least partially, within the computer-readable storage medium 1016, system memory 1006 and/or within the processor(s) 1030 during execution thereof by the multi-radio device 1000, the system memory 1006 and the processor(s) 1030 also constituting computer-readable media. The multi-radio device 1000 may also include one or more input devices 1018 (keyboard, mouse device, specialized selection keys, etc.) and one or more output devices 1020 (displays, printers, audio output mechanisms, etc.).

The multi-radio device 1000 further includes a modem 1022 to allow the multi-radio device 1000 to communicate via a wireless connections (e.g., such as provided by the wireless communication system) with other computing devices, such as remote computers, an item providing system, and so forth. The modem 1022 can be connected to one or more RF modules 1086 that make up the two or more radios. The RF modules 1086 may be a WLAN module, a WAN module, PAN module, GPS module, or the like. The antenna structures (antenna(s) 1087) are coupled to the RF circuitry 1083, which is coupled to the modem 1022. The RF circuitry 1083 may include radio front-end circuitry, antenna switching circuitry, impedance matching circuitry, or the like. The antennas 1084 may be WLAN antennas (such as the surface-link antennas described herein, GPS antennas, NFC antennas, other WAN antennas, WLAN or PAN antennas, or the like. The modem 1022 allows the multi-radio device 1000 to handle both voice and non-voice communications (such as communications for text messages, multimedia messages, media downloads, web browsing, etc.) with a wireless communication system. The modem 1022 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1022 may generate signals and send these signals to antenna(s) 1084 of a first type (e.g., WLAN 5 GHz), antenna(s) 1085 of a second type (e.g., WLAN 2.4 GHz), and/or antenna(s) 1087 of a third type (e.g., WAN), via RF circuitry 1083, and RF module(s) 1086 as descried herein. Antennas 1087 may be configured to transmit in different frequency bands and/or using different wireless communication protocols. The antennas 1087 may be directional, omnidirectional, or non-directional antennas. In addition to sending data, antennas 1087 may also receive data, which is sent to appropriate RF modules connected to the antennas. One of the antennas 1087 may be any combination of the antenna structures described herein.

In one embodiment, the multi-radio device 1000 establishes a first connection using a first wireless communication protocol, and a second connection using a different wireless communication protocol. The first wireless connection and second wireless connection may be active concurrently, for example, if a wireless network device is receiving a media item from another wireless network device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1022 is shown to control transmission and reception via antenna (1087), the multi-radio device 1000 may alternatively include multiple modems, each of which is configured to transmit/receive data via a different antenna and/or wireless transmission protocol.

In the above description, the embodiments of the surface-link antennas and antenna architectures may be used in a wireless network containing multiple network devices, organized in a network topology (e.g., AP-STA, Mesh, and Hybrid). The network devices in the wireless network cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These wireless networks can be used in the interim before broadband Internet infrastructure becomes widely available in those developing nations. The wireless network devices are also referred to herein as mesh routers, mesh network devices, mesh nodes, Meshboxes, or Meshbox nodes, even when not used in mesh configurations. Multiple wireless network devices wirelessly are connected through a network backbone formed by multiple peer-to-peer (P2P) wireless connections (i.e., wireless connections between multiple pairs of the wireless network devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, voice-controlled devices, and the like.

The embodiments of the wireless network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN surfaces services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A multi-radio device comprising:
a first wireless local area network (WLAN) radio, wherein the first WLAN radio operates with a first clear channel assessment energy detect (CCA-ED) threshold that prevents the first WLAN radio from transmitting data when the first WLAN radio detects a first CCA-ED value that exceeds the first CCA-ED threshold, the first CCA-ED value representing an adjacent channel interference (ACI) energy leakage;
a second WLAN radio, wherein the second WLAN radio operates with a second CCA-ED threshold that prevents the second WLAN radio from transmitting data when the second WLAN radio detects a second CCA-ED value that exceeds the second CCA-ED threshold; and
a transmit scheduler circuit coupled to the first WLAN radio and the second WLAN radio, wherein the transmit scheduler circuit comprises a hardware state machine configured to control the first WLAN radio and the second WLAN radio, and wherein the transmit scheduler circuit:
receives a first signal from the first WLAN radio, the first signal indicating that the first WLAN radio is operating in a first mode and transmitting a first frame during a first duration;
receives a second signal from the second WLAN radio, the second signal indicating that the second WLAN radio is operating in a second mode and transmitting a second frame during a second duration, wherein the first duration and the second duration overlap;
outputs a first CCA-ED override signal to the first WLAN radio, wherein the first CCA-ED override signal causes the first WLAN radio to change, during the second duration, the first CCA-ED threshold to a third CCA-ED threshold that is higher than the first CCA-ED threshold; and
outputs a second CCA-ED override signal to the second WLAN radio, wherein the second CCA-ED override signal causes the second WLAN radio to change, during the first duration, the second CCA-ED threshold to a fourth CCA-ED threshold that is higher than the second CCA-ED threshold, wherein the first CCA-ED override signal and the second CCA-ED override signal allow the first WLAN radio and the second WLAN radio to concurrently transmit the first frame and the second frame.

2. The multi-radio device of claim 1, wherein the transmit scheduler circuit:
receives a third signal from the first WLAN radio, the third signal indicating that the first WLAN radio is operating in a third mode and receiving a third frame during a third duration;
outputs, during the third duration, a CCA assert signal to the second WLAN radio, the CCA assert signal preventing the second WLAN radio from transmitting a fourth frame during the third duration, wherein the second WLAN radio, when receiving the CCA assert signal, does not cause ACI energy leakage at the first WLAN radio during the third duration;
after expiration of the third duration and a PCF Interframe Space (PIFS) duration, receives a fourth signal from the second WLAN radio, the fourth signal indicating that the second WLAN radio is operating in a fourth mode and transmitting a fifth frame during a fourth duration; and
outputs the first CCA-ED override signal to the first WLAN radio, wherein the first CCA-ED override signal causes the first WLAN radio to change, during the fourth duration, the first CCA-ED threshold to the second CCA-ED threshold.

3. The multi-radio device of claim 1, wherein the transmit scheduler circuit:
receives a third signal from the first WLAN radio, the third signal indicating that the first WLAN radio is operating in a third mode and receiving a third frame during a third duration;
outputs, during the third duration, a transmit power control signal to the second WLAN radio that transmits data at a first transmit power, the transmit power control signal causing the second WLAN radio, during the third duration, to transmit data at a second transmit power that is less than the first transmit power, wherein the second WLAN radio, when receiving the transmit power control signal, reduces ACI energy leakage at the first WLAN radio from a first level to a second level that is less than the first level, wherein the ACI energy leakage at the first WLAN radio is caused by the second WLAN radio transmitting the data at the second transmit power during the third duration; and
after the third duration and an Arbitrary Interframe Space (AIFS) duration, receives at least one of an additional signal from at least one of the first WLAN radio or the second WLAN radio.

4. An electronic device comprising:
a first wireless local area network (WLAN) radio;
a second WLAN radio; and
a scheduler circuit coupled to the first WLAN radio and the second WLAN radio, wherein the scheduler circuit is to control transmissions by the first WLAN radio and the second WLAN radio using control signals, wherein the scheduler circuit is to:
output a first signal to the first WLAN radio and the second WLAN radio in a first mode in which the first WLAN radio is transmitting first data and the second WLAN radio is transmitting second data concurrently, the first signal increasing a first clear channel assessment energy detect (CCA-ED) threshold of the first WLAN radio to a second CCA-ED threshold and increasing a third CCA-ED threshold of the second WLAN radio to a fourth CCA-ED threshold;
output a second signal to the second WLAN radio in a second mode in which the first WLAN radio is receiving third data and the second WLAN radio is transmitting fourth data, the second signal causing transmission of the fourth data to be delayed until after the first WLAN radio completes reception of the third data; and
output a third signal to the first WLAN radio in a third mode in which the first WLAN radio is transmitting fifth data and the second WLAN radio is receiving sixth data, the third signal causing transmission of the fifth data to be delayed until after the second WLAN radio completes reception of the sixth data.

5. The electronic device of claim 4, wherein the scheduler circuit is to:
output a fourth signal to the second WLAN radio in a fourth mode in which the first WLAN radio is receiving seventh data and the second WLAN radio is transmitting eighth data, the fourth signal causing the second WLAN radio to change a transmit power level from a first level to a second level that is less than the first level, wherein the second WLAN radio transmit the eighth data at the second level while the first WLAN radio receives the seventh data; and
output a fifth signal to the second WLAN radio in a fifth mode in which the first WLAN radio is transmitting ninth data and the second WLAN radio is receiving tenth data, the fifth signal causing the first WLAN radio to change a transmit power level from a third level to a fourth level that is less than the third level, wherein the first WLAN radio transmits the ninth data at the second level while the second WLAN radio receives the tenth data.

6. The electronic device of claim 4, further comprising a third WLAN radio coupled to the scheduler circuit, wherein the scheduler circuit is to:

output the first signal to the first WLAN radio, the second WLAN radio, and the third WLAN radio in a fourth mode in which the first WLAN radio is transmitting seventh data, the second WLAN radio is transmitting eighth data, and the third WLAN radio is transmitting ninth data concurrently, the first signal increasing the first CCA-ED threshold of the first WLAN radio to the second CCA-ED threshold, increasing the third CCA-ED threshold of the second WLAN radio to the fourth CCA-ED threshold, and increasing a fifth CCA-ED threshold of the third WLAN radio to a sixth CCA-ED threshold;

output the second signal to the first WLAN radio and the second WLAN radio in a fifth mode in which the first WLAN radio is transmitting tenth data and the second WLAN radio is transmitting eleventh data and the third WLAN radio is receiving twelfth data, the second signal causing transmissions of the tenth data and the eleventh data to be delayed until after the third WLAN radio completes reception of the twelfth data; and output the second signal to the first WLAN radio in a sixth mode in which the first WLAN radio is transmitting thirteenth data and the second WLAN radio is receiving fourteenth data and the third WLAN radio is receiving fifteenth data, the second signal causing transmissions of the thirteenth data to be delayed until after the second WLAN radio completes reception of the fourteenth data and after the third WLAN radio completes reception of the fifteenth data.

7. The electronic device of claim 4, further comprising a third WLAN radio coupled to the scheduler circuit, wherein the scheduler circuit is to:

output the first signal to the first WLAN radio, the second WLAN radio, and the third WLAN radio in a fourth mode in which the first WLAN radio is transmitting seventh data, the second WLAN radio is transmitting eighth data, and the third WLAN radio is transmitting ninth data concurrently, the first signal increasing the first CCA-ED threshold of the first WLAN radio to the second CCA-ED threshold, increasing the third CCA-ED threshold of the second WLAN radio to the fourth CCA-ED threshold, and increasing a fifth CCA-ED threshold of the third WLAN radio to a sixth CCA-ED threshold;

output a fourth signal to the first WLAN radio and the second WLAN radio in a fifth mode in which the first WLAN radio is transmitting tenth data and the second WLAN radio is transmitting eleventh data and the third WLAN radio is receiving twelfth data, the fourth signal causing the first WLAN radio and the second WLAN radio to change a transmit power level from a first level to a second level that is less than the first level, wherein the first WLAN radio transmits the tenth data at the second level and the second WLAN radio transmits the eleventh data at the second level while the third WLAN radio receives the twelfth data; and output a fifth signal to the first WLAN radio in a sixth mode in which the first WLAN radio is transmitting thirteenth data and the second WLAN radio is receiving fourteenth data and the third WLAN radio is receiving fifteenth data, the fifth signal causing the first WLAN radio to change the transmit power level to the second level, wherein the first WLAN radio transmit the thirteenth data at the second level while the second WLAN radio receives the fourteenth data and the third WLAN radio receives the fifteenth data.

8. The electronic device of claim 4, wherein the scheduler circuit is to:
receive a first state signal from the first WLAN radio;
receive a second state signal from the second WLAN radio; and
transition into the first mode using the first state signal and the second state signal.

9. The electronic device of claim 8, wherein the scheduler circuit is further to:
receive an energy detect level signal from a host processor; and
output an override level signal to the first WLAN radio and the second WLAN radio in the first mode, the first signal and the override level signal collectively causing the first WLAN radio to change the first CCA-ED threshold to a fifth CCA-ED threshold that is different than the second CCA-ED threshold and collectively causing the second WLAN radio to change the third CCA-ED threshold to a sixth CCA-ED threshold that is different than the fourth CCA-ED threshold.

10. The electronic device of claim 4, wherein the scheduler circuit is to:
receive a first state signal from the first WLAN radio;
receive a second state signal from the second WLAN radio; and
transition into the third mode using the first state signal and the second state signal.

11. The electronic device of claim 10, wherein the scheduler circuit is further to:
receive a control signal from a host processor;
transition from the third mode to a fourth mode using the first state signal, the second state signal, and the control signal; and
output a fourth signal to the first WLAN radio in the fourth mode in which the first WLAN radio is transmitting the fifth data and the second WLAN radio is receiving the sixth data, the fourth signal causing the first WLAN radio to change a transmit power level from a first level to a second level that is less than the first level, wherein the first WLAN radio transmits the fifth data at the second level while the second WLAN radio receives the sixth data.

12. The electronic device of claim 4, wherein the scheduler circuit is to:
receive a first state signal from the first WLAN radio;
receive a second state signal from the second WLAN radio; and
transition into the second mode using the first state signal and the second state signal.

13. The electronic device of claim 12, wherein the scheduler circuit is to:
receive a control signal from a host processor;
transition from the second mode to a fourth mode using the first state signal, the second state signal, and the control signal; and
output a fourth signal to the second WLAN radio in the fourth mode in which the first WLAN radio is receiving the third data and the second WLAN radio is transmitting the fourth data, the fourth signal causing the second WLAN radio to change a transmit power level from a first level to a second level that is less than the first level, wherein the second WLAN radio transmits the fourth data at the second level while the first WLAN radio receives the third data.

14. A method of operating a multi-radio device, the method comprising:
- determining, by a scheduler circuit of the multi-radio device, a mode of the multi-radio device using a first state of a first wireless local area network (WLAN) radio and a second state of a second WLAN radio;
- outputting, by the scheduler circuit, a first signal to the first WLAN radio and the second WLAN radio in a first mode in which the first WLAN radio is transmitting first data and the second WLAN radio is transmitting second data concurrently, the first signal increasing a first clear channel assessment (CCA) energy detect (ED) threshold of the first WLAN radio to a second CCA-ED threshold and increasing a third CCA-ED threshold of the second WLAN radio to a fourth CCA-ED threshold;
- outputting, by the scheduler circuit, a second signal to the second WLAN radio in a second mode in which the first WLAN radio is receiving third data and the second WLAN radio is transmitting fourth data, the second signal causing transmission of the fourth data to be delayed until after the first WLAN radio completes reception of the third data; and
- outputting, by the scheduler circuit, a third signal to the first WLAN radio in a third mode in which the first WLAN radio is transmitting fifth data and the second WLAN radio is receiving sixth data, the third signal causing transmission of the fifth data to be delayed until after the second WLAN radio completes reception of the sixth data.

15. The method of claim 14, further comprising:
- outputting, by the scheduler circuit, a fourth signal to the second WLAN radio in a fourth mode in which the first WLAN radio is receiving seventh data and the second WLAN radio is transmitting eighth data, the fourth signal causing the second WLAN radio to change a transmit power level from a first level to a second level that is less than the first level, wherein the second WLAN radio transmit the eighth data at the second level while the first WLAN radio receives the seventh data; and
- outputting, by the scheduler circuit, a fifth signal to the second WLAN radio in a fifth mode in which the first WLAN radio is transmitting ninth data and the second WLAN radio is receiving tenth data, the fifth signal causing the first WLAN radio to change a transmit power level from a third level to a fourth level that is less than the third level, wherein the first WLAN radio transmits the ninth data at the second level while the second WLAN radio receives the tenth data.

16. The method of claim 14, wherein the determining the mode using the first state of the first WLAN radio, the second state of the second WLAN radio, and a third state of a third WLAN radio, wherein the method further comprises:
- outputting, by the scheduler circuit, the first signal to the first WLAN radio, the second WLAN radio, and the third WLAN radio in a fourth mode in which the first WLAN radio is transmitting seventh data, the second WLAN radio is transmitting eighth data, and the third WLAN radio is transmitting ninth data concurrently, the first signal increasing the first CCA-ED threshold of the first WLAN radio to the second CCA-ED threshold, increasing the third CCA-ED threshold of the second WLAN radio to the fourth CCA-ED threshold, and increasing a fifth CCA-ED threshold of the third WLAN radio to a sixth CCA-ED threshold;
- outputting, by the scheduler circuit, the second signal to the first WLAN radio and the second WLAN radio in a fifth mode in which the first WLAN radio is transmitting tenth data and the second WLAN radio is transmitting eleventh data and the third WLAN radio is receiving twelfth data, the second signal causing transmissions of the tenth data and the eleventh data to be delayed until after the third WLAN radio completes reception of the twelfth data; and
- outputting, by the scheduler circuit, the second signal to the first WLAN radio in a sixth mode in which the first WLAN radio is transmitting thirteenth data and the second WLAN radio is receiving fourteenth data and the third WLAN radio is receiving fifteenth data, the second signal causing transmissions of the thirteenth data to be delayed until after the second WLAN radio completes reception of the fourteenth data and after the third WLAN radio completes reception of the fifteenth data.

17. The method of claim 14, further comprising:
- outputting, by the scheduler circuit, the first signal to the first WLAN radio, the second WLAN radio, and a third WLAN radio in a fourth mode in which the first WLAN radio is transmitting seventh data, the second WLAN radio is transmitting eighth data, and the third WLAN radio is transmitting ninth data concurrently, the first signal increasing the first CCA-ED threshold of the first WLAN radio to the second CCA-ED threshold, increasing the third CCA-ED threshold of the second WLAN radio to the fourth CCA-ED threshold, and increasing a fifth CCA-ED threshold of the third WLAN radio to a sixth CCA-ED threshold;
- outputting, by the scheduler circuit, a fourth signal to the first WLAN radio and the second WLAN radio in a fifth mode in which the first WLAN radio is transmitting tenth data and the second WLAN radio is transmitting eleventh data and the third WLAN radio is receiving twelfth data, the fourth signal causing the first WLAN radio and the second WLAN radio to change a transmit power level from a first level to a second level that is less than the first level, wherein the first WLAN radio transmits the tenth data at the second level and the second WLAN radio transmits the eleventh data at the second level while the third WLAN radio receives the twelfth data; and
- outputting, by the scheduler circuit, the fourth signal to the first WLAN radio in a sixth mode in which the first WLAN radio is transmitting thirteenth data and the second WLAN radio is receiving fourteenth data and the third WLAN radio is receiving fifteenth data, the fourth signal causing the first WLAN radio to change the transmit power level to the second level, wherein the first WLAN radio transmit the thirteenth data at the second level while the second WLAN radio receives the fourteenth data and the third WLAN radio receives the fifteenth data.

18. The method of claim 14, further comprising:
- receiving, by the scheduler circuit, an energy detect level signal from a host processor; and
- outputting, by the scheduler circuit, an override level signal to the first WLAN radio and second WLAN radio in the first mode, the first signal and the override level signal collectively causing the first WLAN radio to change the first CCA-ED threshold to a fifth CCA-ED threshold that is different than the second CCA-ED threshold and collectively causing the second WLAN radio to change the third CCA-ED threshold to a sixth CCA-ED threshold that is different than the fourth CCA-ED threshold.

19. The method of claim 14, further comprising:

receiving, by the scheduler circuit, a control signal from a host processor; and outputting, by the scheduler circuit, a fourth signal to the first WLAN radio in a fourth mode in which the first WLAN radio is transmitting the fifth data and the second WLAN radio is receiving the sixth data, the fourth signal causing the first WLAN radio to change a transmit power level from a first level to a second level that is less than the first level, wherein the first WLAN radio transmits the fifth data at the second level while the second WLAN radio receives the sixth data.

20. The method of claim 14, further comprising:

receiving, by the scheduler circuit, a control signal from a host processor; and outputting, by the scheduler circuit, a fourth signal to the second WLAN radio in a fourth mode in which the first WLAN radio is receiving the third data and the second WLAN radio is transmitting the fourth data, the fourth signal causing the second WLAN radio to change a transmit power level from a first level to a second level that is less than the first level, wherein the second WLAN radio transmits the fourth data at the second level while the first WLAN radio receives the third data.

* * * * *